United States Patent
Romanski et al.

(10) Patent No.: US 9,201,891 B2
(45) Date of Patent: Dec. 1, 2015

(54) STORAGE SYSTEM

(75) Inventors: Bartlomiej Romanski, Warsaw (PL); Lukasz Heldt, Warsaw (PL); Wojciech Kilian, Warsaw (PL); Krzysztof Lichota, Warsaw (PL); Cezary Dubnicki, Warsaw (PL)

(73) Assignee: NEC CORPORATION, Tokyo (JP)

( * ) Notice: Subject to any disclaimer, the term of this patent is extended or adjusted under 35 U.S.C. 154(b) by 346 days.

(21) Appl. No.: 13/819,568

(22) PCT Filed: Aug. 25, 2011

(86) PCT No.: PCT/JP2011/004718
§ 371 (c)(1),
(2), (4) Date: Apr. 1, 2013

(87) PCT Pub. No.: WO2012/029258
PCT Pub. Date: Mar. 8, 2012

(65) Prior Publication Data
US 2013/0212074 A1    Aug. 15, 2013

Related U.S. Application Data

(60) Provisional application No. 61/378,820, filed on Aug. 31, 2010.

(51) Int. Cl.
*G06F 17/30* (2006.01)
*G06F 12/02* (2006.01)

(52) U.S. Cl.
CPC ...... *G06F 17/30156* (2013.01); *G06F 12/0253* (2013.01)

(58) Field of Classification Search
CPC ............. G06F 17/30156; G06F 12/0253
See application file for complete search history.

(56) References Cited

U.S. PATENT DOCUMENTS

| | | | |
|---|---|---|---|
| 6,810,398 B2 | 10/2004 | Moulton | |
| 8,407,186 B1 | 3/2013 | Cremelie et al. | |
| 2007/0239946 A1 | 10/2007 | Zhu | |
| 2008/0005141 A1* | 1/2008 | Zheng et al. | 707/101 |
| 2008/0243769 A1* | 10/2008 | Arbour et al. | 707/2 |

(Continued)

FOREIGN PATENT DOCUMENTS

| | | |
|---|---|---|
| CN | 1716215 A | 1/2006 |
| CN | 101595459 A | 12/2009 |

(Continued)

OTHER PUBLICATIONS

Extended European Search Report, dated Mar. 7, 2014, issued by the European Patent Office, in counterpart Application No. 11821282.8.

(Continued)

*Primary Examiner* — Apu Mofiz
*Assistant Examiner* — Jared Bibbee
(74) *Attorney, Agent, or Firm* — Sughrue Mion, PLLC

(57) ABSTRACT

Duplicate storage elimination is performed in units of block data generated by dividing a data stream into arbitrary-sized blocks. Further, sub-block data is generated by further dividing the block data into a plurality of pieces of data, and sub-address data based on the data content of each of the pieces of sub-block data is stored in a predetermined storage device. As such, duplicate storage elimination is also performed in sub-block data units based on the sub-address data.

13 Claims, 18 Drawing Sheets

(56) References Cited

U.S. PATENT DOCUMENTS

| | | | |
|---|---|---|---|
| 2009/0089483 A1* | 4/2009 | Tanaka et al. | 711/103 |
| 2009/0132619 A1* | 5/2009 | Arakawa et al. | 707/205 |
| 2009/0313248 A1 | 12/2009 | Balachandran et al. | |
| 2010/0064166 A1 | 3/2010 | Dubnicki et al. | |
| 2010/0250858 A1* | 9/2010 | Cremelie et al. | 711/136 |
| 2011/0238635 A1* | 9/2011 | Leppard | 707/693 |
| 2011/0289281 A1* | 11/2011 | Spackman | 711/154 |
| 2012/0072396 A1* | 3/2012 | Mu | 707/650 |

FOREIGN PATENT DOCUMENTS

| | | |
|---|---|---|
| JP | 2004-514968 A | 5/2004 |
| JP | 2010-79886 A | 4/2010 |
| WO | 96/25801 A1 | 8/1996 |

OTHER PUBLICATIONS

Kruus, et al., "Bimodal Content Defined Chunking for Backup Streams", FAST '10 Proceedings of the 8th USENIX Conference on File and Storage Technologies, Feb. 23, 2010, XP055104789.

Romanski, et al., "Anchor-Driven Subchunk Deduplication", SYSTOR '11, May 30, 2011, pp. 1-13, XP055035332.

Meister, et al., "Multi-Level Comparison of Data Deduplication in a Backup Scenario", Proceedings of Systor 2009: The Israeli Experimental Systems Conference on, SYSTOR '09, May 4, 2009, pp. 1-12, XP055104779, New York, New York, USA.

Clements, et al., "Decentralized Deduplication in SAN Cluster File Systems", Jan. 31, 2009, XP055104604.

Communication dated Dec. 8, 2014, issued by the State Intellectual Property Office of the People's Republic of China in counterpart Application No. 201180041801.7.

* cited by examiner

Fig. 3

| Name | Wiki | Neclab | Mail |
|---|---|---|---|
| Number of backups | 5 | 14 | 32 |
| Avg. backup size | 25 GB | 78 GB | 34 GB |
| Total size | 125 GB | 1086 GB | 1087 GB |

Fig. 7

|  | neclab | mail | wiki | total |
|---|---|---|---|---|
| subchunk 64k/8k | 45.81 | 32.37 | 45.06 | 43.89 |
| bimodal 64k/8k | 41.61 | 21.79 | 35.45 | 36.10 |
| bimodal 32k/4k | 21.03 | 12.51 | 15.22 | 18.05 |
| CDC 16k | 15.15 | 16.54 | 14.78 | 15.20 |

Fig. 8

|  | neclab | mail | wiki | total |
|---|---|---|---|---|
| subchunk 64k/8k | 43.72 | 23.96 | 23.64 | 30.44 |
| bimodal 64k/8k | 39.93 | 20.81 | 32.62 | 27.60 |
| bimodal 32k/4k | 20.35 | 11.43 | 14.09 | 14.60 |
| CDC 16k | 14.62 | 15.62 | 14.50 | 15.07 |

STORAGE SYSTEM

TECHNICAL FIELD

The present invention relates to a storage system, and in particular, to a storage system with data deduplication.

BACKGROUND ART

The primary value of deduplication is obviously in reduction of required storage space, which translates into improved reliability and significant operational savings due to reduced power consumption and overall lower facility costs. However, for these savings to materialize, we need to consider total storage space necessary to keep not only backup data, but also all types of metadata (e.g. backup application metadata, intermediate level metadata like filesystems and proper back-end metadata used for location and deduplication). Adding metadata to the picture is not only necessary to estimate the savings from deduplication, but often changes the relative utility of various deduplication alternatives in a particular storage system.

Today, the standard technique for dividing backup data into chunks for deduplication is the content defined chunking (CDC) (NPL 16, 20). It produces variable-length chunks using Rabin's fingerprints (NPL 22) to select chunk boundaries in the input stream. CDC has many advantages. It does not maintain any state and it is effective in the presence of data insertions and deletions in the original stream, as unmodified cut points are recalled on the next chunker run, resulting in identification of unchanged chunks for deduplication. Moreover, to work well, CDC does not need to know backup stream boundaries and their sequencing. This fits nicely with the reality of commercial setups, where a standard backup application usually assumes "dumb" storage back-end, which makes communication of this information to the back-end impossible.

CITATION LIST

Non Patent Literature

NPL 1: EMC Corp. EMC Centera: content addressed storage system, January 2008. http://www.emc.com/products/family/emccentera-family.htm?-openfolder=platform.

NPL 2: ARONOVICH, L., ASHER, R., BACHMAT, E., BITNER, H., HIRSCH, M., AND KLEIN, S. T. The design of a similarity based deduplication system. In SYSTOR '09: Proceedings of SYSTOR 2009: The Israeli Experimental Systems Conference (New York, N.Y., USA, 2009), ACM, pp. 1-14.

NPL 3: BARRETO, JO A., AND FERREIRA, P. Efficient file storage using content-based indexing. In SOSP '05: Proceedings of the twentieth ACM symposium on Operating systems principles (New York, N.Y., USA, 2005), ACM, pp. 1-9.

NPL 4: BARRETO, JO A., AND FERREIRA, P. Efficient locally trackable deduplication in replicated systems. In Middleware'09: Proceedings of the ACM/IFIP/USENIX 10th international conference on Middleware (Berlin, Heidelberg, 2009), Springer-Verlag, pp. 103-122.

NPL 5: BHAGWAT, D., ESHGHI, K., LONG, D. D. E., AND LILLIBRIDGE, M. Extreme binning: Scalable, parallel deduplication for chunk-based file backup.

NPL 6: BHAGWAT, D., POLLACK, K., LONG, D. D. E., SCHWARZ, T., MILLER, E. L., AND PARIS, J.-F. Providing high reliability in a minimum redundancy archival storage system. In MASCOTS '06: Proceedings of the 14th IEEE International Symposium on Modeling, Analysis, and Simulation (Washington, D.C., USA, 2006), IEEE Computer Society, pp. 413-421.

NPL 7: BOBBARJUNG, D. R., JAGANNATHAN, S., AND DUBNICKI, C. Improving duplicate elimination in storage systems. Trans. Storage 2, 4 (2006), 424-448.

NPL 8: COX, L. P., MURRAY, C. D., AND NOBLE, B. D. Pastiche: making backup cheap and easy. In OSDI '02: Proceedings of the 5th symposium on Operating systems design and implementation (New York, N.Y., USA, 2002), ACM, pp. 285-298.

NPL 9: DUBNICKI, C., GRYZ, L., HELDT, L., KACZMARCZYK, M., KILIAN, W., STRZELCZAK, P., SZCZEPKOWSKI, J., UNGUREANU, C., AND WELNICKI, M. Hydrastor: a scalable secondary storage. In FAST '09: Proceedings of the 7th conference on File and storage technologies (Berkeley, Calif., USA, 2009), USENIX Association, pp. 197-210.

NPL 10: KRUUS, E., UNGUREANU, C., AND DUBNICKI, C. Bimodal content defined chunking for backup streams. In FAST (2010), pp. 239-252.

NPL 11: KULKARNI, P., DOUGLIS, F., LAVOIE, J., AND TRACEY, J. M. Redundancy elimination within large collections of files. In ATEC '04: Proceedings of the annual conference on USENIX Annual Technical Conference (Berkeley, Calif., USA, 2004), USENIX Association, pp. 5-5.

NPL 12: LEE, W., AND PARK, C. An adaptive chunking method for personal data backup and sharing, February 2010. 8th USENIX Conference on File and Storage Technologies (FAST 10) poster session.

NPL 13: LILLIBRIDGE, M., ESHGHI, K., BHAGWAT, D., DEOLALIKAR, V., TREZIS, G., AND CAMBLE, P. Sparse indexing: Large scale, inline deduplication using sampling and locality. In FAST (2009), pp. 111-123.

NPL 14: MANDAGERE, N., ZHOU, P., SMITH, M. A., AND UTTAMCHANDANI, S. Demystifying data deduplication. In Companion '08: Proceedings of the ACM/IFIP/USENIX Middleware '08 Conference Companion (New York, N.Y., USA, 2008), ACM, pp. 12-17.

NPL 15: MEISTER, D., AND BRINKMANN, A. Multi-level comparison of data deduplication in a backup scenario. In SYSTOR '09: Proceedings of SYSTOR 2009: The Israeli Experimental Systems Conference (New York, N.Y., USA, 2009), ACM, pp. 1-12.

NPL 16: MUTHITACHAROEN, A., CHEN, B., AND MAZIRES, D. A low-bandwidth network file system. In Proceedings of the 18th ACM Symposium on Operating Systems Principles (SOSP '01 (New York, N.Y., USA, 2001), ACM, pp. 174-187.

NPL 17: NATH, P., URGAONKAR, B., AND SIVASUBRAMANIAM, A. Evaluating the usefulness of content addressable storage for high-performance data intensive applications. In HPDC '08: Proceedings of the 17th international symposium on High performance distributed computing (New York, N.Y., USA, 2008), ACM, pp. 35-44.

NPL 18: PARK, K., IHM, S., BOWMAN, M., AND PAI, V. S. Supporting practical content-addressable caching with czip compression. In ATC '07: 2007 USENIX Annual Technical Conference on Proceedings of the USENIX Annual Technical Conference (Berkeley, Calif., USA, 2007), USENIX Association, pp. 1-14.

NPL 19: POLICRONIADES, C., AND PRATT, I. Alternatives for detecting redundancy in storage systems data. In ATEC '04: Proceedings of the annual conference on USENIX Annual Technical Conference (Berkeley, Calif., USA, 2004), USENIX Association, pp. 6-6.

NPL 20: PORTS, D. R. K., CLEMENTS, A. T., AND DEMAINE, E. D. Persifs: a versioned file system with an efficient representation. In SOSP '05: Proceedings of the twentieth ACM symposium on Operating systems principles (New York, N.Y., USA, 2005), ACM, pp. 1-2.

NPL 21: QUINLAN, S., AND DORWARD, S. Venti: a new approach to archival storage. In First USENIX conference on File and Storage Technologies (Monterey, Calif., 2002), USENIX Association, pp. 89-101.

NPL 22: RABIN, M. Fingerprinting by random polynomials. Tech. Rep. TR-15-81 (1981).

NPL 23: RHEA, S., COX, R., AND PESTEREV, A. Fast, inexpensive content-addressed storage in foundation. In Proceedings of the 2008 USENIX Annual Technical Conference (Berkeley, Calif., USA, 2008), USENIX Association, pp. 143-156.

NPL 24: SPRING, N. T., AND WETHERALL, D. A protocol-independent technique for eliminating redundant network traffic. SIGCOMM Comput. Commun. Rev. 30, 4 (2000), 87-95.

NPL 25: TOLIA, N., KOZUCH, M., SATYANARAYANAN, M., KARP, B., BRESSOUD, T., AND PERRIG, A. Opportunistic use of content addressable storage for distributed file systems. In PROCEEDINGS OF THE 2003 USENIX ANNUAL TECHNICAL CONFERENCE (2003), pp. 127-140.

NPL 26: WEI, J., JIANG, H., ZHOU, K., AND FENG, D. Mad2: A scalable high-throughput exact deduplication approach for network backup services. In Proceedings of the 26th IEEE Symposium on Massive Storage Systems and Technologies (MSST) (May 2010).

NPL 27: YOU, L. L., POLLACK, K. T., AND LONG, D. D. E. Deep store: An archival storage system architecture. In ICDE '05: Proceedings of the 21st International Conference on Data Engineering (Washington, D.C., USA, 2005), IEEE Computer Society, pp. 804-8015.

NPL 28: ZHU, B., LI, K., AND PATTERSON, H. Avoiding the disk bottleneck in the data domain deduplication file system. In FAST'08: Proceedings of the 6th USENIX Conference on File and Storage Technologies (Berkeley, Calif., USA, 2008), USENIX Association, pp. 1-14.

SUMMARY OF INVENTION

Technical Problem

Although the chunks produced by CDC are of variable length, their actual sizes are clustered around the expected chunk size value which is a parameter of CDC algorithm. When using CDC, for any given sequence of backup streams and a particular back-end, there exists an optimal expected chunk value which delivers the best deduplication. This selection depends on the type and the frequency of data modifications in subsequent streams, as well as on metadata overhead imposed on chunk representation.

Using small chunks is not optimal because of metadata overhead, moreover, small chunks also tend to negatively impact performance. On the other hand, larger chunks are also often sub-optimal when granularity of modifications in subsequent backups is fine-grain. These tradeoffs suggest selection of a moderate expected chunk size which should work well for a given storage system. However, we can often do better than that because granularity of change in backup stream is not constant even with one sequence of backups (not to mention across multiple series of unrelated backups).

As such, an exemplary object of the present invention is to provide a storage system capable of realizing more efficient data deduplication.

Solution to Problem

According to an aspect of the present invention, a storage system includes a block data deduplication unit that stores, in a storage device, block data generated by dividing a data stream into arbitrary-sized blocks, the block data being pointed to by address data based on the data content of the block data, and when attempting to store, in the storage device, another piece of block data having a data content identical to the data content of the block data having been stored in the storage device, stores, in the storage device, the address data pointing to the block data having been stored in the storage device as the other piece of block data to thereby perform duplicate storage elimination of the block data. The storage system also includes a sub-block data deduplication unit that stores, in the storage device, sub-block data generated by further dividing the block data into a plurality of pieces of data, each of the pieces of sub-block data being pointed to by a piece of sub-address data based on the data content of the sub-block data, stores a sub-address data group including pieces of sub-address data in a predetermined storage device, and when attempting to store, in the storage device, another piece of sub-block data having a data content identical to the data content of the sub-block data having been stored in the storage device, stores, in the predetermined storage device, the piece of sub-address data pointing to the sub-block data having been stored in the storage device as the other piece of sub-block data to thereby perform duplicate storage elimination of the sub-block data.

According to another aspect of the present invention, a computer-readable medium storing a program including instructions for causing an information processing device to realize, a block data deduplication unit that stores, in a storage device, block data generated by dividing a data stream into arbitrary-sized blocks, the block data being pointed to by address data based on the data content of the block data, and when attempting to store, in the storage device, another piece of block data having a data content identical to the data content of the block data having been stored in the storage device, stores, in the storage device, the address data pointing to the block data having been stored in the storage device as the other piece of block data to thereby perform duplicate storage elimination of the block data; and a sub-block data deduplication unit that stores, in the storage device, sub-block data generated by further dividing the block data into a plurality of pieces of data, each of the pieces of sub-block data being pointed to by a piece of sub-address data based on the data content of the sub-block data, stores a sub-address data group including pieces of sub-address data in a predetermined storage device, and when attempting to store, in the storage device, another piece of sub-block data having a data content identical to the data content of the sub-block data having been stored in the storage device, stores, in the predetermined storage device, the piece of sub-address data pointing to the sub-block data having been stored in the storage device as the other piece of sub-block data to thereby perform duplicate storage elimination of the sub-block data.

According to another aspect of the present invention, an information processing method includes storing, in a storage device, block data generated by dividing a data stream into arbitrary-sized blocks, the block data being pointed to by address data based on the data content of the block data, and when attempting to store, in the storage device, another piece of block data having a data content identical to the data content of the block data having been stored in the storage device, storing, in the storage device, the address data pointing to the block data having been stored in the storage device as the other piece of block data thereby performing duplicate storage elimination of the block data. The method also includes storing, in the storage device, sub-block data generated by further dividing the block data into a plurality of pieces of data, each of the pieces of sub-block data being pointed to by a piece of sub-address data based on the data content of the sub-block data, storing a sub-address data group including pieces of sub-address data in a predetermined storage device, and when attempting to store, in the storage device, another piece of sub-block data having a data content identical to the data content of the sub-block data having been stored in the storage device, storing, in the predetermined storage device, the piece of sub-address data pointing to the sub-block data having been stored in the storage device as the other piece of sub-block data thereby performing duplicate storage elimination of the sub-block data.

Advantageous Effects of Invention

As the present invention is configured as described above, it is possible to provide a storage system capable of realizing more efficient data deduplication.

BRIEF DESCRIPTION OF DRAWINGS

FIG. 3 is a table showing datasets to be tested according to the first exemplary embodiment;

FIG. 7 is a table showing the average block size according to the tests performed in the first exemplary embodiment;

FIG. 8 is a table showing the average chunk size according to the tests performed in the first exemplary embodiment;

DESCRIPTION OF EMBODIMENTS

<First Exemplary Embodiment>

Figure 1:
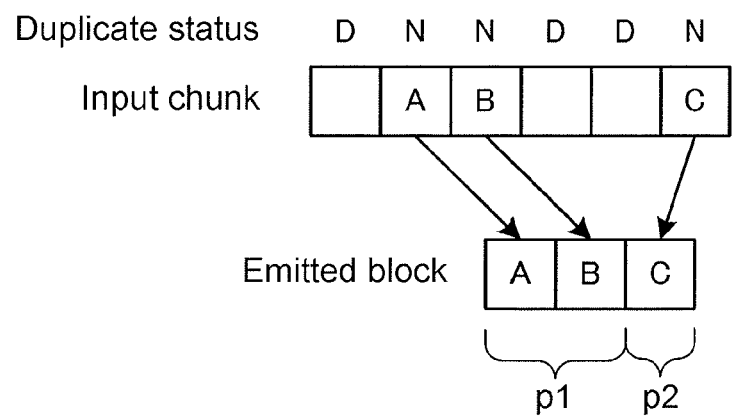
FIG. 1 is an explanation view for explaining the aspect of new block emission according to a first exemplary embodiment.

In the present embodiment, we provide a better method for realizing more efficient deduplication in the storage system. That is, in multiple backups, we have long stretches of data which do not change for long periods of time for which large chunk sizes are better, interspersed with regions of change preferring smaller chunk sizes.

As such, in the present invention, we describe a new algorithm called anchor-driven subchunk deduplication. The new algorithm deduplicates on two levels—with large chunks and their subchunks. The dedup with small chunks is done by using a limited deduplication context of subchunk-to-container-chunk translations. This context is read from the back-end and updated dynamically in the process of writing backup data. The context is small and can be kept in the main memory.

The new approach does not require back-end knowledge about backup streams and allows for small chunk dedup across all streams. At the same time, the context keeps most of subchunk translations needed for effective dedup with small chunks. In the present invention, the claims of the present invention were verified by simulating the new algorithm with a set of backup traces and comparing the results against the numbers achieved with alternative, previously described algorithms.

Hereinafter, the present embodiment provides as follows. First, the new deduplication algorithm will be discussed in detail. Then, its evaluation based on simulation driven by a set of real backup traces will be provided. Then, related work is discussed, and finally conclusions and future work will be given.

(The Algorithm)

(System Model)

The storage system of the present invention is modeled after HYDRAstor described in NPL 9, which consists of the front-end built of access nodes (ANs) exporting file system abstraction; and the back-end built as multi-node block store keeping variable-size content-addressable blocks. In the present invention, we differentiate between chunks and blocks of data. A chunk is usually a contiguous piece of user data stream with borders defined by a chunker to maximize deduplication opportunity. A block is a base unit stored by the back-end. A block contains a piece of a user data which is this block chunk, and the associated back-end level block metadata. However, a chunk may also contain pointers to other blocks. Pointers are represented as hash addresses and facilitate building trees keeping file system structures.

The system can be accessed by several backup servers writing and restoring backups with standard backup applications, which are unaware of special capabilities of the storage system like deduplication. For discussion of this algorithm, it is not necessary to assume a scalable distributed storage system like the one described above. However, such system is more likely than a centralized one to store backups with wide variations of deduplication patterns, so there is a stronger motivation for not using one expected chunk size for all stored data. It should be noted that the data to be stored in the storage system in the present invention may be any type of data, without being limited to backup data.

In the base system, backup streams are cut on access nodes into chunks using CDC algorithm and written as blocks to the block store. If a chunk being written is found not to be a duplicate, such new chunk is compressed and erasure-coded for resiliency and the obtained block fragments are stored on different block store servers. It should be noted that in the present invention, data is not necessary divided, compressed, or erasure-coded.

The system supports on-demand data deletion implemented with per-block reference counting. The deletion proceeds in two phases: garbage identification which re-computes block counters; and space reclamation which removes in the background blocks with counter value zero. Interaction with deletion must be taken into account when designing a deduplication algorithm.

In such system, there are several types of metadata which should be included in an evaluation of deduplication algorithms: the lowest-level is block metadata including the content-derived address of this block. Next level metadata contains pointers belonging to this block. There is also higher-level metadata associated with file system structures, for example inode table.

A loss of one block with pointers may incapacitate multiple files or even file systems (NPL 6), as such blocks can be also deduplicated. Therefore, all system metadata as well as blocks with pointers are kept in multiple copies. For user data, the system supports multiple erasure-coded resiliency levels, most with much lower overhead and resiliency. The default level introduces 33% overhead and allows to survive 3 node and disk failures.

(Deduplication with Multiple Chunk Sizes)

Two previous attempts at deduplication with multiple chunk sizes directly motivate the present invention.

Bimodal approach (NPL 10) uses two chunk sizes, small and large. By default, new data is chunked with large chunk size. Additionally, on each transition between a duplicate chunk and a non-duplicate chunk, one or a few more adjacent large chunks of new data are further chunked into smaller chunks, and these small chunks are inserted into the back-end. This algorithm does not need any additional database of small chunks; instead, it uses the existence query to the back-end to verify duplicate status of large chunks before deciding which chunks will be actually emitted.

A fingerdiff algorithm (NPL 7) for each dataset maintains a database of all small chunks encountered but not necessarily emitted in the latest backup. This database is in addition to the emitted chunk metadata maintained by the back-end. Fingerdiff detects duplicates on small chunk level and coalesces them as much as possible (with a limit of maximum possible number of small chunks for all new data).

These two approaches offer a room for improvement. Bimodal approach "forgets" small chunks in deduplicated large chunks, which is especially important on borders of regions of change. Fingerdiff requires a substantial database of all small chunks seen so far in the latest backups, even though for data which does not change often it is not useful. This database may also not fit in the main memory, seriously affecting the performance. Moreover, fingerdiff assumes that storage system is able to identify relation between backup streams, which often today is not the case, as explained earlier. Finally, fingerdiff will not detect duplicates on the small chunk level across unrelated backup streams.

(Deduplication with Subchunks)

The new algorithm called anchor-driven subchunk deduplication of the present invention addresses the shortcomings of the previous approaches described above.

In an overview, the deduplication with subchunks looks as follows. The base deduplication is done with a relatively large expected chunk size (for example, 64 KB), to ensure good performance and keep the size of the local database on each SN manageable. When a big chunk is found not to be a duplicate, we try to deduplicate its subchunks. They are defined within a given chunk by running CDC algorithm with a lower expected block size. For example, the expected sub-chunk size can be 8 KB when the expected chunk size is 64 KB, resulting in 8 subchunks within 1 chunk on average. The metadata of a block with subchunks delineated is much smaller than when each subchunk is stored as a separate block because subchunks share a lot of block metadata.

Additionally, new metadata containing translations from sub-chunks to container chunks do not need to have as high resiliency as block metadata. It is sufficient that these translations are kept with resiliency equal to user data. If these translations are lost, the worst case would be decreased deduplication effectiveness, but on a very limited scale, as certainly the level of user data resiliency should not result in likely massive failures.

Assume that when writing a backup stream, we can create on access nodes a set of relevant subchunk-tocontainer-chunk translations. We call this set subchunk deduplication context and it is discussed in detail below. For each subchunk of a new, non-duplicated chunk, we look for a relevant translation in the subchunk deduplication context local to this access node. If such translation is found, we issue one more deduplication query to the block store to verify that the container chunk still exists there and contains the requested subchunk. This step is needed because translations may be stale and garbage collection may remove unused subchunks. Only if the data to be deduplicated is present in the block store, the subchunk is deduplicated with the address generated from this translation.

The subchunks which are not deduplicated in this process are coalesced and emitted as one large block, as illustrated in FIG. 1. In such case, individual subchunk translations are added to the context. This means that when a new block is emitted, non-duplicated new subchunks (status: N), close to each other, are coalesced and emitted as one block having two pointers pointing to subchunks p1 and p2. It should be noted that a status: N indicates a non-duplicated subchunk. This will be described below.

(Subchunk Deduplication Context)

When deduplicating a backup stream with subchunks, we do not need access to all previously generated sub-chunks. Instead, it is sufficient to have access to sub-chunks from the previous version of this backup which are "close" in the backup stream to the current position in the backup stream being written. Using this observation, we construct on an AN a subchunk deduplication context as a local cache keeping subchunk-to-container-chunk translations for such sub-chunks.

Figure 2:
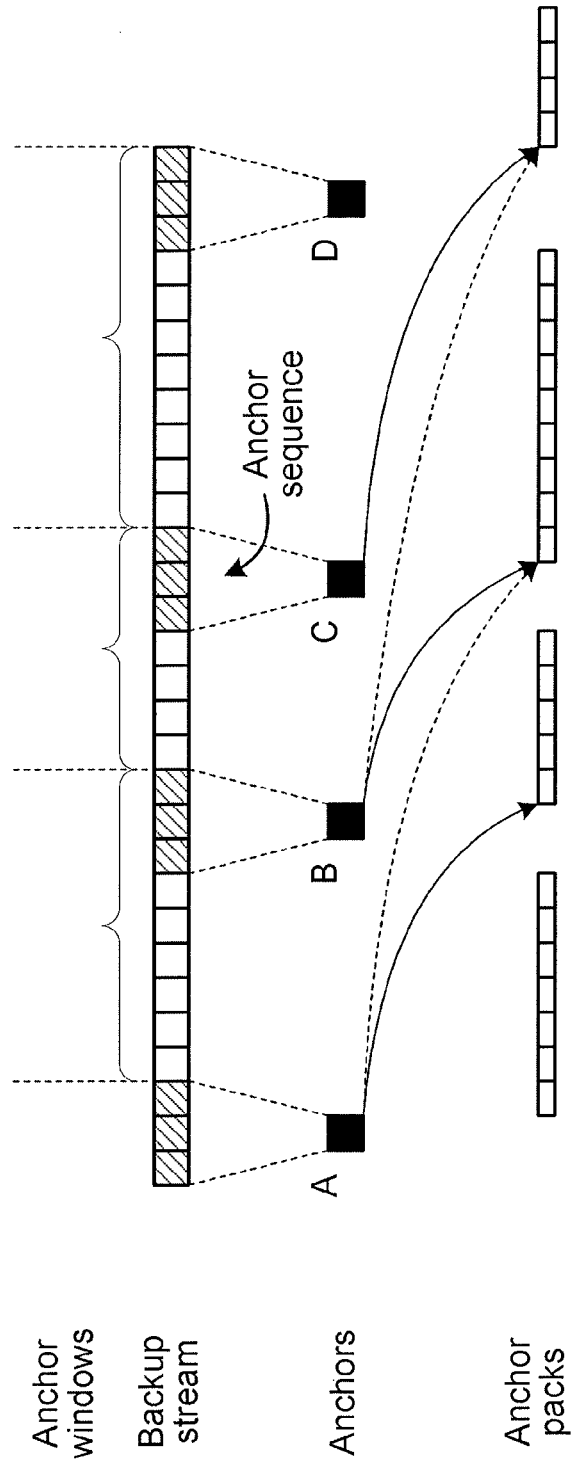
FIG. 2 is an explanation view for explaining the aspect of storing a data stream according to the first exemplary embodiment.

The deduplication context is built on-the-fly with the help of the so-called anchors when writing a backup stream. An anchor is a special type of block and has 3 items conceptually associated with it, as illustrated in FIG. 2: (1) the anchor chunk sequence which is a short sequence (1 to 3) of large chunks adjacent in the backup stream being written; (2) the anchor window covering a substantial contiguous part of the backup stream being written. Such window size is usually several hundreds of MBs and the entire backup stream is covered by disjoint anchor windows; and (3) the anchor pack containing subchunk-to-container-chunk translations including non-duplicated subchunks in the anchor window. These translations are created when writing backup data for all encountered chunks and their subchunks.

The anchor sequence consists of a fixed number of chunks in the backup stream for which a special hash defined below has some predefined number of trailing bits equal to 0. The special hash is the regular chunk hash for one-chunk anchor sequence; and this hash is defined as the hash of individual hashes of each of sequence chunks for a multi-chunk anchor. Note that we control frequency of anchors with the number of bits in this special hash which must be 0; the fewer bits, the more frequent anchors. It should be noted that the anchor sequence is not limited to being composed of the chunks as described above, and may consist of chunks having other features.

The anchor window is usually located in the backup stream well ahead of the anchor chunk sequence associated with this window in order to have enough time to fetch necessary translations before writing and chunking data requiring them. Since anchors can disappear in a new backup stream, each anchor contains pointers not only to its window translations as indicated by the arrows of solid lines in FIG. 2, but also to anchor packs for a few subsequent windows as indicated by the arrows of dotted lines in FIG. 2.

While a backup is being written, besides anchor generation for the current backups, the algorithm checks for detection of anchors created previously. Upon detection, all packs pointed by this anchor are read into a local cache building deduplication context. At the same time, a new value of the anchor is computed and eventually emitted replacing the old one. However, not all of the anchor packs are necessarily read into a local cache.

Unlike in fingerdiff as described above, the deduplication is global, not per-stream, because anchors are stored globally in the block store, so it is possible to identify similar parts of a backup stream coming from different backup servers or different clients (for example, operating system files in case of backup of workstations).

When an anchor sequence and the associated anchor window existing in the old backup have not changed with the new backup, the new anchor is identical to the old one, and the new one will be deduplicated. If data in anchor windows has changed, but anchor blocks are not modified, the new anchor will overwrite the old one and the old one will be reclaimed. Additionally, we need a process of periodic sweep of all anchors (for example, once a week), to remove anchors which have not been used for any deduplication since the last sweep.

In terms of storage overhead, all anchor packs together occupy space comparable to fingerdiff per-backup databases. The big difference is that anchor packs are small and can be combined to build deduplication context which fits in the main memory, whereas fingerdiff database for a huge backup is large and will not fit there. Additionally, for fingerdiff we need to know relations among backup streams and stream boundaries, whereas anchor-based approach does not require this knowledge.

Compared to bimodal, the new approach allows for more extensive searching for duplicate data. Unlike bimodal, the new algorithm checks for deduplication using subchunks encountered previously in both non-duplicated and duplicated chunks, as the subchunk translation context contains all these translations. Bimodal checks only for subchunks of non-duplicate chunks adjacent to at least one duplicate chunk in the stream being written.

(Details and Refinements)

In the base system, an entire chunk was compressed and erasure coded. With subchunk dedup, we need to be able to read an individual subchunk. This can be achieved by reading the entire container block and extracting the desired subchunk. However, this is not very efficient, so we propose to compress and erasure code individual subchunks. As a result, a new "fragment" contains fragments of all subchunks of a given chunk. We extend block metadata to remember offsets of all subchunk fragments in the chunk fragment.

After backup removal, it may happen that some subchunks are dead and need to be also removed, while others are alive and need to be preserved. For this reason, the garbage collection algorithm needs to be changed to allow identification of dead chunks and reclamation of their space. To facilitate subchunk-within-chunk location after space reclamation, we need to keep a bit vector with each block metadata indicating which of the original subchunks are still present. Moreover, each subchunk needs to get a small reference counter (a few bits) to allow subchunk reclamation. Such counter can be small, because in rare cases when it overflows, such subchunk will not be reclaimed until the entire block is reclaimed.

To enable subchunk-based deduplication, we extend the address format with a subchunk selector. There are multiple forms of subchunk selector possible. One is just a subchunk order number. For example, with 8 sub-chunks in 1 chunk on the average, it is enough to extend the address with 4 bits, allowing for addressing of the entire chunk and up to 15 individual subchunks.

One possible refinement is adjacent subchunk coalescing which is done when a large chunk cannot be deduplicated, but multiple adjacent subchunks can. This can be determined based solely on translations, without additional queries to the back-end. In such a case, we generate only one pointer to a range of subchunks. To allow this, the subchunk selector is changed into subchunk range selector which contains two subchunk numbers—in the example above we would extend the address by 1 byte instead of 4 bits.

(Evaluation)

Here, we evaluate the subchunk algorithm (further referred to as subchunk) proposed in the present invention against CDC and the bimodal using three datasets described below.

Since direct operation on real backup data would have taken too long, we used a special chunking tool introduced in NPL 10, to generate compressed backup traces. The tool dumps all potential cut points and hashes of data chunks between them. Such preprocessing greatly reduces the size of test data and the evaluation time. On the average, we can process about 60 GB of traces, corresponding to 1 TB of real data, in less than 20 minutes.

For a given dataset, and a given algorithm, we define DER (duplication elimination ratio) as the total size of all data stored in the system divided by the total disk space needed. DER can be calculated without or with metadata included. We call the former the data-only DER, and the latter the real DER.

Data-only DER is simple and well defined, and, unlike real DER, it does not depend on the actual storage system characteristics. On the other hand, in real DER calculation all factors that can influence storage needed by a real system are taken into account. That includes data redundancy level, compression ratio and the space needed for all kinds of metadata.

The value of real DER strongly depends on an actual system model. The metadata overhead of the model of the present invention is described later.

(Test Data)

Our experiments are based on 3 datasets described in FIG. 3. The wiki dataset consists of 5 official XML snapshots of English Wikipedia. Files contain only the newest versions of regular pages. Change history, special pages, images, etc. are not included. Snapshots were created quite rarely, on average once a month. Because of long periods between backups, low number of backups and the characteristic of wiki data (fine, frequent changes), deduplication ratio measured on this dataset is very low. Real DER varies from 1.06 to 1.52 depending on the algorithm chosen.

The next dataset, neclab, represents typical backup data. This is the same dataset that was used in NPL 10. It consists of 14 full weekly Netware backups of user directories. Real DER measured on this dataset varies from 3.16 to 3.76.

The last dataset, mail, consists of 32 daily snapshots of mailboxes of 52 consultants at 9LivesData. This is a very specific dataset. A typical user mailbox does not change much daily, so deduplication measured on this dataset should be very high (close to the number of backups). However, a single snapshot of a user's mailbox is stored as a tar archive usually containing thousands of very small files, one message per file. Order of these files in a tar archive depends on tar and file-system internals and changes slightly from time to time. If an expected chunk size spans over multiple files, even slight permutations in their order can adversely affect many duplicate elimination algorithms. Moreover, the changing order of data can potentially result in a very high data fragmentation. Real DER measured on this dataset varies from 13.08 to 18.37.

An artificial dataset further referenced as total was built by concatenating all 3 datasets. Real DER for this dataset varies from 4.35 to 5.19.

(Policies Tested)

All algorithms have been tested in many possible configurations. The first algorithm, CDC, was tested with the expected chunk size set to all powers of 2 from 4 KB to 256 KB. As expected, CDC generates chunks with sizes clustered around the expected chunk size.

For bimodal, described above, we have used big chunks with expected chunk size varying from 8 KB to 256 KB, and the expected small chunk size that is always 8 times smaller.

The anchor-based deduplication, proposed in the present invention, was configured with the expected chunk size set to all powers of 2 from 8 KB to 256 KB, and the expected small chunk size always 8 times smaller. Anchor length was set to 1 chunk. Anchor level was set to 10, i.e. the average distance between anchors was $2^{10}=1024$ chunks (or 8192 small chunks). Cache size was set to 0.5 mln entries (capable to store translations from about 64 packs), and prefetch was set to 16 packs (corresponding to 1 GB of real data stream). Such configuration provides reasonable balance between the DER achieved by the algorithm and the resources needed to run it.

The algorithm labeled as perfect-cache works similarly to the subchunk but, instead of using anchor-based mechanism, it puts all encountered translations directly in the cache, which in this case is unlimited. Such algorithm is impractical, but its deduplication is an upper bound for the subchunk approach.

(Comparison Using Data-only DER)

Figure 4:
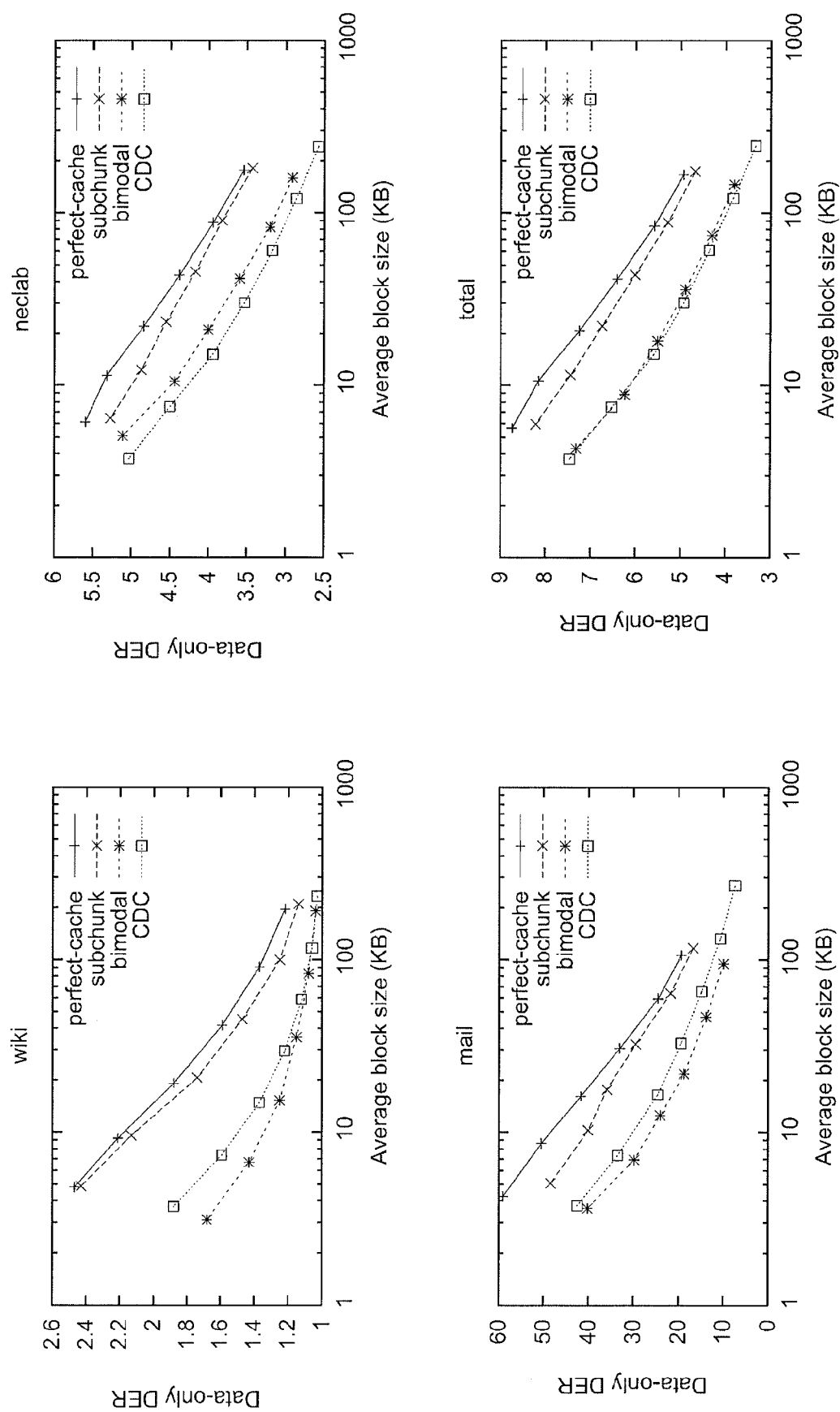
FIG. 4 shows charts illustrating data-only DER as a function of average block size according to the tests performed in the first exemplary embodiment.

FIG. 4 presents data-only DER as a function of an average block size. This is for all 3 datasets and for all algorithms. Each chart represents a different dataset, each curve—a different algorithm, and each point—a different configuration (different expected chunk size). The idea behind such presentation is that a desired duplicate elimination algorithm should not only achieve high DER, but also maintain high average block size, which is necessary to keep metadata overhead and performance overhead on acceptable levels. The average block size is defined as the total size of all unique blocks stored in the system divided by the number of such blocks (even if a single block appears in many backup streams, it is still counted as one). This is a different statistic than the average chunk size described later in detail.

Naturally, using a smaller block size results in better deduplication if metadata is not included. In almost all cases, data-only DER is nearly linear in logarithm of an average block size.

Regardless of the dataset, the algorithm proposed in the present invention performs better than CDC and the bimodal. While maintaining big average block size, it performs deduplication on a (much finer) subchunk level resulting in higher DER. In the case of perfect-cache algorithm, this is cleanly visible. The deduplication achieved by CDC with X KB chunks is almost equal to the deduplication achieved by the perfect-cache algorithm with X KB subchunks. Such relation is satisfied regardless of the expected chunk size used by the perfect-cache algorithm, only the expected subchunk size matters. However, the perfect-cache algorithm needs to maintain a huge index of all subchunks which requires a lot of resources and is not easily implementable.

DER achieved by the algorithm proposed in the present invention depends mostly on the performance of the anchor-based mechanism used for prefetching translations. The better the anchors work, the higher deduplication. As can be seen, the anchor-based subchunk deduplication is quite close to the perfect-cache algorithm proving that anchor-based mechanism for prefetching translations works reasonably well. We define the cache hit ratio as the number of duplicated subchunks found by the anchor-based mechanism divided by the number of duplicated subchunks found by the perfect-cache algorithm. Indeed, in the basic configuration (64 KB chunks and 8 KB subchunks) cache hit ratio is quite high (81% for wiki dataset, 87% for neclab, and 99% for mail).

As expected, bimodal performs better than CDC on the neclab data. This is the dataset used in NPL 10, and our results are consistent with theirs. Surprisingly, on other datasets DER achieved by bimodal is slightly worse than DER achieved by CDC. This can happen in the case of many small changes in random places. Big chunk is rechunked into small chunks only if it is a neighbor of a duplicated chunk. If a block is chunked in one backup and does not change in the next backup stream, such block has to be re-chunked every time in order not to lose some deduplication opportunity. Such situation does not happen very often in neclab traces but quite often in wiki and mail resulting in slightly worse performance of bimodal.

(Comparison Using Real DER)

The picture looks significantly different when all kinds of metadata are included. In the system model described above, each block is stored as 12 fragments created with erasure coding. For most data, 9 are original fragments and 3 are redundant fragments, however blocks with pointers are kept in 12 copies. Compression level is globally estimated as a linear function of logarithm of a block size (about 0.77 for 64 KB blocks and about 0.80 for 8 KB blocks). Each block stored has 124 bytes of metadata associated with it. To provide high performance and resiliency against failures all metadata are stored in 12 copies which results in 1344 bytes of metadata overhead per block. In a real system, blocks with pointers can also be deduplicated resulting in less metadata overhead (especially for small blocks), but in the model we emulate only the worst-case scenario where blocks with pointers are not deduplicated. Therefore, there must be a pointer for each chunk appearing in any backup stream (no matter if this chunk is a duplicate or not), and all pointers are also stored in 12 copies.

The subchunk algorithm needs extra space for storing translation packs. A single translation contains SHA-1 of a subchunk (20 bytes long), an index and SHA-1 of a whole chunk. Since SHA-1 of a whole chunk is usually shared between a few translations, a single translation should easily fit into 32 bytes. Translations packs can be stored with low resiliency—in case of data loss, DER will slightly drop to the level of whole-chunk CDC, but the system will remain fully functional. Therefore, in our experiments we have assumed that the resiliency of anchor packs is the same as the resiliency of user data.

Figure 5:
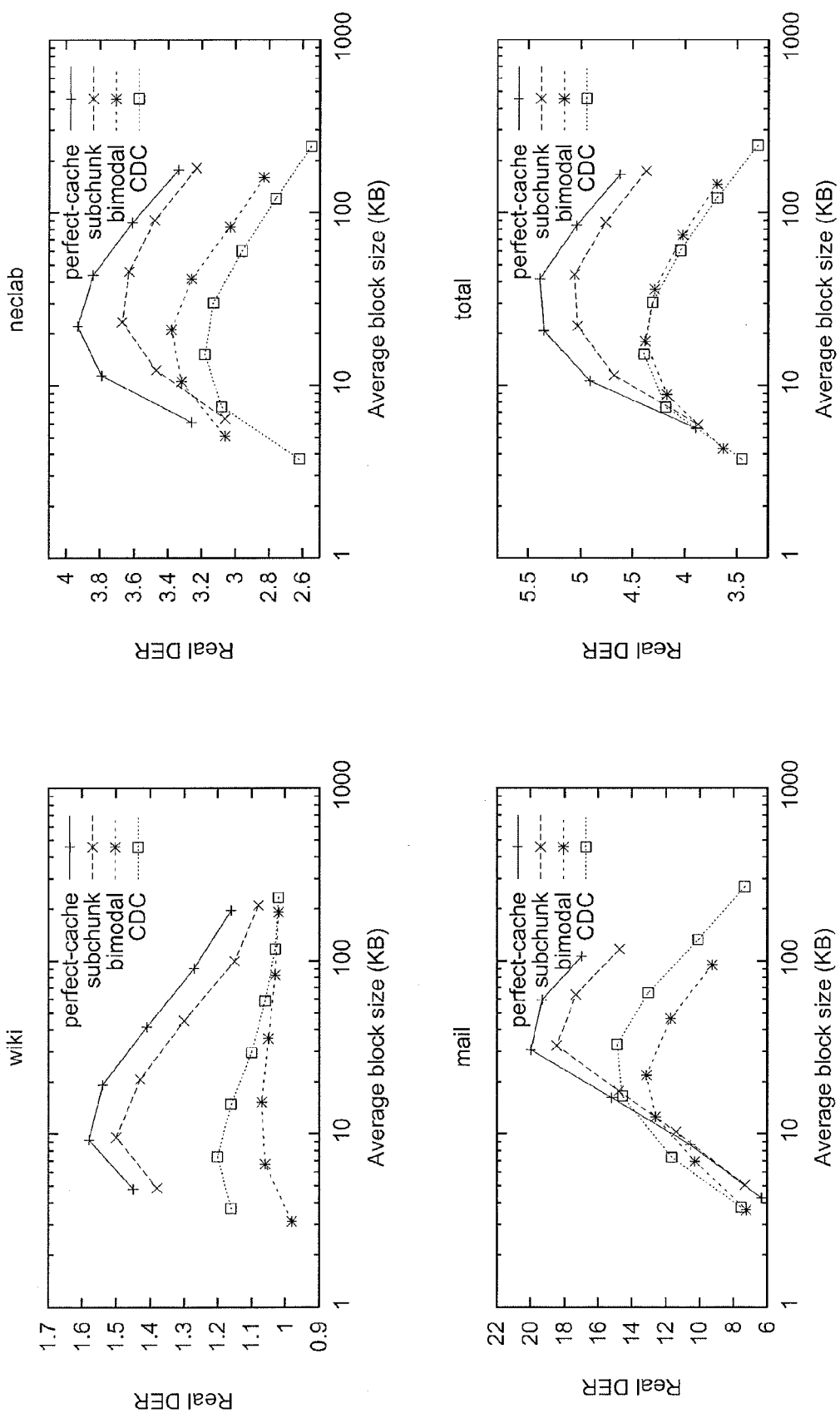
FIG. 5 shows charts illustrating real DER as a function of average block size according to the tests performed in the first exemplary embodiment.

FIG. 5 presents real DER as a function of an average block size stored in a system. When all kinds of metadata are included in DER calculations, lowering block size results in better deduplication only until some point, after which extra space needed for storing metadata exceeds space gained by better deduplication.

For each dataset and for each algorithm, there is some optimal block size resulting in the highest possible real DER. With a given algorithm (and without lowering metadata overhead, which is usually not an easy task), we cannot get better DER. Of course, the optimal block size varies heavily depending on the chosen dataset. Using different expected chunk sizes for various datasets needs extra manual configuration and may break global deduplication—duplicates cannot be found between two streams chunked with different chunking policies.

For CDC, the optimal expected chunk size is equal to 8 KB for wiki (DER=1.20), 16 KB for neclab (DER=3.18), and 32 KB for mail (DER=14.89). Average chunk size equal to 16 KB sounds as a reasonable global choice for all these datasets. On artificial total dataset it achieves DER=4.39.

Bimodal performs well on neclab dataset—for 32 KB big chunk and 4 KB small chunk it achieves DER=3.38 (6% improvement over CDC). However, it performs rather poorly on wiki (DER=1.07 at 32 KB big chunks) and mail (DER=13.14 at 64 KB big chunks). On the total dataset expected big chunk size equal to 32 KB is the best choice (DER=4.35).

The performance achieved by the subchunk algorithm proposed in the present invention is significantly higher. For the wiki dataset, the optimal average block size is 16 KB resulting in DER=1.50 which is a 25% improvement over the optimal CDC. For the neclab dataset, the optimal average block size is 32 KB resulting in DER=3.67 which is a 15% improvement over CDC. Also for the mail dataset the optimal subchunk algorithm uses 64 KB blocks and gives DER=18.45 which is a 24% improvement over the optimal CDC. For the total dataset, the subchunk algorithm performs best with the expected block size equal to 64 KB (DER=5.06, a 15% improvement over CDC). As chunk size becomes very small, the performance of the subchunk algorithm gets worse and close to CDC, or even below CDC on mail traces. This is because for small chunks (e.g. 8 KB) subchunk is very small (e.g. 1 KB) which leads to very short average block size and results in too much metadata.

(Reading Performance)

Deduplicating backup data may lead to backups which are no longer stored as contiguous streams but instead they consist of many small chunks of data scattered throughout the system. Such fragmentation results in more disk operations (seeks) needed during reads.

Highly scalable storage systems typically have a lot of resources and more disk seeking usually will not affect negatively the performance, especially if only one or just few streams are read at the same time. On the other hand, when designing a duplication algorithm, its impact on data fragmentation should be evaluated. Data fragmentation is a broad subject, mostly out of scope of the present invention, but we present here results of a basic evaluation to show that the algorithm proposed in the present invention does not result in a worse fragmentation than alternative solutions.

To evaluate disk reading performance, we have simplified model of a storage system assuming that all blocks are stored in a single contiguous file placed on a single physical disk. All new (not duplicated) blocks are written at the end of the file, while duplicated blocks are simply skipped. In this model, we do not take into consideration storing any metadata. In the present invention, reading is simulated in the following way. Blocks are requested one by one in the order of appearing in the backup stream. When the block is being fetched from disk, we extend the read operation to read also a number of following blocks. The expected single read size is 256 KB. All blocks that fit in this limit are loaded in a read cache and the next block is loaded if and only if half of it fits in the limit (this, a bit strange, condition can avoid problem of rounding down the number of prefetched blocks). Size of the cache is limited to 1 GB. If a block is already present in the cache, we do not need an extra IO operation. We use total number of IO operations necessary to read the last (the most fragmented) backup as a measure of fragmentation.

In the case of the subchunk algorithm, the model is slightly different. We follow the same strategy, but instead of using big blocks, we operate on subchunks because the system is capable of reading individual sub-chunks thanks to the modifications in the block representation.

Figure 6:
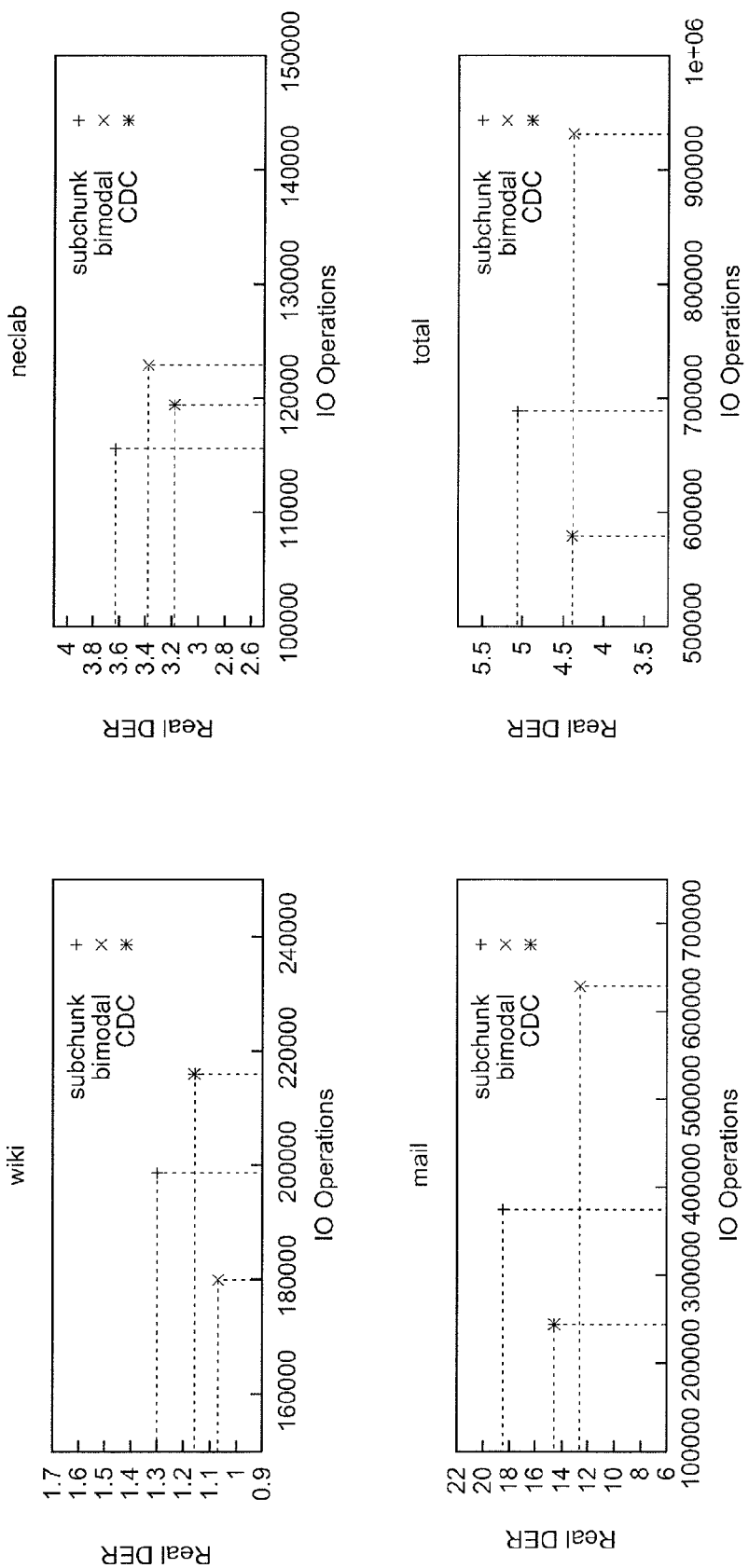
FIG. 6 shows charts illustrating real DER and the number of disk operations needed to read last backup according to the tests performed in the first exemplary embodiment.

To compare all algorithms for each of them, we have chosen the best settings in terms of real DER (64 KB big and 8 KB small chunks for subchunk, 32 KB and 4 KB chunks for bimodal and 16 KB chunks for CDC). FIG. 6 presents real DER for each algorithm against the number of disk operations needed to read the last (the most fragmented) backup.

The results strongly depend on the dataset. For neclab, the subchunk algorithm results in the lowest fragmentation and the highest real DER, which is the best case. This is a good news as this trace should reflect a typical backup data. Generally, there should be a trade-off between deduplication and fragmentation. Better dedup should result in more fragmentation but as we can see there are exceptions.

For mail and wiki traces the subchunk algorithm fragmentation is always between the other two algorithms fragmentation, but the real DER is always the highest. For these traces we pay in fragmentation for what we get in the improved deduplication.

Another factor that can potentially affect the read performance is the average chunk size defined as the total size of all data streams stored in the system divided by the total number of pointers. In average chunk size calculation duplicates are counted several times, unlike in average block calculation. Shorter average chunk means that for the same amount of data more pointers have to be stored and processed.

FIGS. 7 and 8 show the average block size and the average chunk size respectively for the best instance of each algorithm, and additionally for bimodal with the 64 KB big chunk. This instance shows effectiveness of bimodal, as the 64 KB big chunk bimodal results in only slightly lower dedup ratio than the best bimodal, but delivers substantially larger average block and chunk sizes. However, the subchunk instance delivering the best dedup ratio still generates larger average blocks and chunks in almost all cases compared even to bimodal with 64 KB chunks.

The subchunk algorithm tries to emit big chunks by default and generates a block containing less data than a big chunk only after the remainder of such chunk has been deduplicated. Bimodal shares with the subchunk algorithm the first advantage but not the second, as bimodal emits small blocks on the border of change speculatively, in a hope that they will be used for deduplication later. However, such expected savings sometimes do not materialize. As a result, subchunk algorithm generates a much larger average blocks, compared to those generated by CDC and bimodal. Additionally, because of pointers to subchunks, there is a much bigger difference between the average block size and the average chunk size in case of the subchunk algorithm, than for the other two algorithms.

(Configuration Adjustment)

Figure 9:
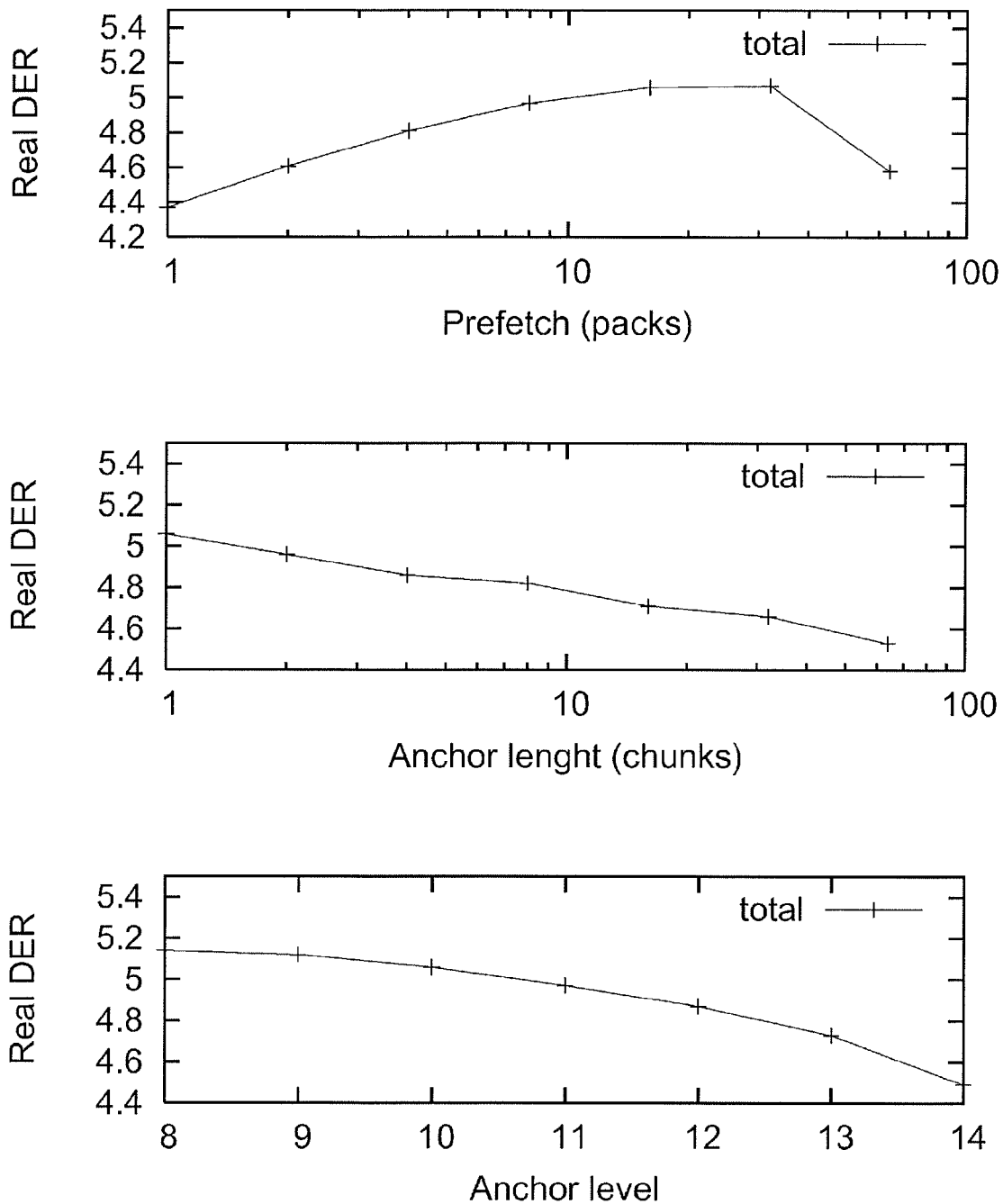
FIG. 9 shows charts illustrating relations between real DER and various parameters according to the tests performed in the first exemplary embodiment.

Here, we show how real DER is affected by changing a single parameter from the base configuration of the subchunk algorithm (described above for the 64 KB expected chunk size). To simplify the plots, we present the results for the total dataset only. Usually, the results for individual datasets do not differ significantly. The results are shown in the relations between real DER and various parameters of FIG. 9.

The first parameter tuned is the anchor length—the number of consecutive chunks forming an anchor. Surprisingly, the best results can be achieved for anchors created from a single chunk, as real DER drops linearly with the logarithm of the number of chunks used. Shorter anchors are more likely to appear unchanged in subsequent Prefetch (packs) backups, which is necessary to download the appropriate translation packs.

The next parameter is the anchor level. The anchor level equal to n means that the expected distance between anchors is equal to $2^n$ chunks. With changing the anchor level, also the number of packs to prefetch has been adjusted to always prefetch translations corresponding to 1 GB of real data. Setting more frequent anchors results in better deduplication, but, since each anchor generates a read and write operations, too frequent anchors can reduce performance. We decided to use anchor level equal to 10, resulting in the expected distance between anchors equal to 64 MB for 64 KB block.

We have also modified the number of packs to be prefetched. Generally, increasing length of the prefetch results in better deduplication. The sudden drop for the highest value is caused by translation cache pruning. This cache works as a queue, and due to a large prefetch size, the translations needed are evicted from the cache before being used. Increasing the cache size would help in such case. We have experimented with bigger caches but the results were not significantly better and we kept 1 GB prefetch as a reasonable compromise.

Finally, we have experimented with other expected subchunk sizes but our experiments have not shown any significant improvement.

Besides configuration tuning, we have also tested a few modifications to the algorithm. The first one is coalescing leftovers (blocks made of not duplicated subchunks). Instead of emitting a single leftover block for each chunk, we can join a few of them and emit a single block. Such modification almost does not affect DER—leftovers are quite rare and very unlikely to duplicate, but it allows us to maintain high average block size.

The other one is limiting the number of subchunks inside a single chunk. With default chunker configuration, the maximum number of subchunks is 24, while the expected number of them is 8. If our system requires constant size of metadata records, this can lead to waste of space—we need to reserve about 3 B for each sub-chunk no matter if it is present or not. However, we can coalesce all subchunks above some limit. Our experiments show that limiting number of subchunks to 12 affects deduplication only slightly (data-only DER drops from 6.01 to 5.95 on total dataset), while limiting to 16 does not affect it at all (data-only DER drops by less than 0.01).

(Related Work)

Besides fingerdiff and bimodal chunking already discussed, there are many papers related to deduplication in general and chunking in particular.

Extreme binning (NPL 5) is an efficient, scalable technique for finding duplicates in similar files using single-size chunking. However, it requires knowledge of whole file contents for computing a representative chunk and thus cannot be directly applied to streaming data.

Sparse index (NPL 13) is similar to extreme binning, applied to streaming data by splitting incoming chunks into segments and performing deduplication against chosen segment chunks. It does not employ any technique for more fine-grained duplicate detection using different levels of chunking.

Adaptive chunking method (NPL 12) is an interesting idea of switching between CDC and fixed size chunking in order to minimize necessary processing power on mobile devices.

EMC Centera (NPL 1) was one of the first products that proved that content addressability can be used for duplicate elimination. However, because of computing the content address on whole files, Centera was not able to perform sub-file deduplication.

Venti (NPL 21) is an early adoption of CAS for duplicate elimination in archival file system. It uses fixed-size blocks, so it cannot deduplicate shifted contents.

MAD2 (NPL 26), HYDRAstor (NPL 9), and DDFS (NPL 28) are examples of implemented systems using CDC chunking and content addressable storage. Foundation (NPL 23) uses content-addressable storage to effectively store and deduplicate versions of entire hard disks in nightly snapshots.

REBL (NPL 11) combines duplicate elimination using content-defined chunking with delta encoding and compression for getting the best possible compression ratio. Pastiche (NPL 8) uses content-defined chunking, content-addresses and content-based encryption for secure backup of client systems in peer-to-peer network while limiting the storage overhead by detecting shared chunks and storing only one copy of each chunk.

CZIP (NPL 18) is a generic compression file format using chunking and CAS for general use, e.g. in content distribution servers, file transfer or web caching.

The network traffic redundancy elimination scheme presented in NPL 24 uses a representative set of Rabin fingerprints to find regions of possible duplicate content in network communication, which bears some resemblance to anchors described in this work.

LBFS (NPL 16) is an example of applying content-defined chunking and content verification to a network filesystem in order to limit bandwidth usage on network links. It uses Rabin fingerprinting for breaking files into chunks and resulting Rabin hash for finding possible duplicates while using SHA-1 for final verification if a chunk has exactly the same contents. CASPER (NPL 25) is an example of opportunistic use of CAS for speeding up file system access over low-speed links if CAS data is available.

RedFS distributed filesystem (NPL 4) combines local deduplication for groups of files with finding similar file groups based on vectors of groups known to replica in order to minimize data transferred between distributed replicas.

ProtecTier system described in NPL 2 employs representative Rabin fingerprints to perform deduplication using similarity matching instead of content addresses on large blocks of data, which allows it to store much smaller index for deduplication purposes.

The idea of coalescing content pointers have been suggested in implementation of partially content-shared filesystem (NPL 3). It uses offline deduplication based on similarity detection and allows for chunking and deduplication of only shared portions of file in order to minimize chunks metadata overhead.

NPL 15 and NPL 19 contain an analysis of possible deduplication gains using CDC and other techniques on real-world data. NPL 14 contains a comprehensive comparison of pros and cons of various deduplication techniques and discusses tradeoffs among deduplication ratio, metadata overhead and reconstruction time.

DeepStore (NPL 27) compares the efficiency of CAS and delta compression in duplicate elimination and discusses reliability of deduplicated data. Reliability of storing fewer chunks of data as a result of deduplication is also analyzed in NPL 6. NPL 17 discusses effect of chunk size on finding commonality in different types of data, influence of metadata overhead on space savings and loss of resiliency due to storing chunk only once in CAS storage.

(Conclusions and Future Work)

In the present invention, we have proposed the subchunk deduplication algorithm which is driven by a dynamically prefetched subchunk deduplication context of a limited size. This context provides most of the translations needed for an effective deduplication on the sub-chunk level. Moreover, the context input translations can be stored as not-so-important metadata, i.e. with low resiliency overhead. The new algorithm additionally reduces effective metadata overhead by using whole chunks when possible and sharing most of metadata among subchunks belonging to the same chunk. As a result, for systems with significant metadata overhead, the subchunk algorithm results in superior real DER compared to other approaches like the traditional CDC and the bimodal while delivering significantly bigger average block and chunk sizes. At the same time, for standard backup traces, the new algorithm results in less fragmentation. For other data streams the fragmentation may be higher, but this is a cost of improved deduplication.

For future work, we plan to evaluate the new algorithm using more backup traces and to study in detail how to address the fragmentation problem without reducing significantly the deduplication ratio.

<Second Exemplary Embodiment>

Figure 10:
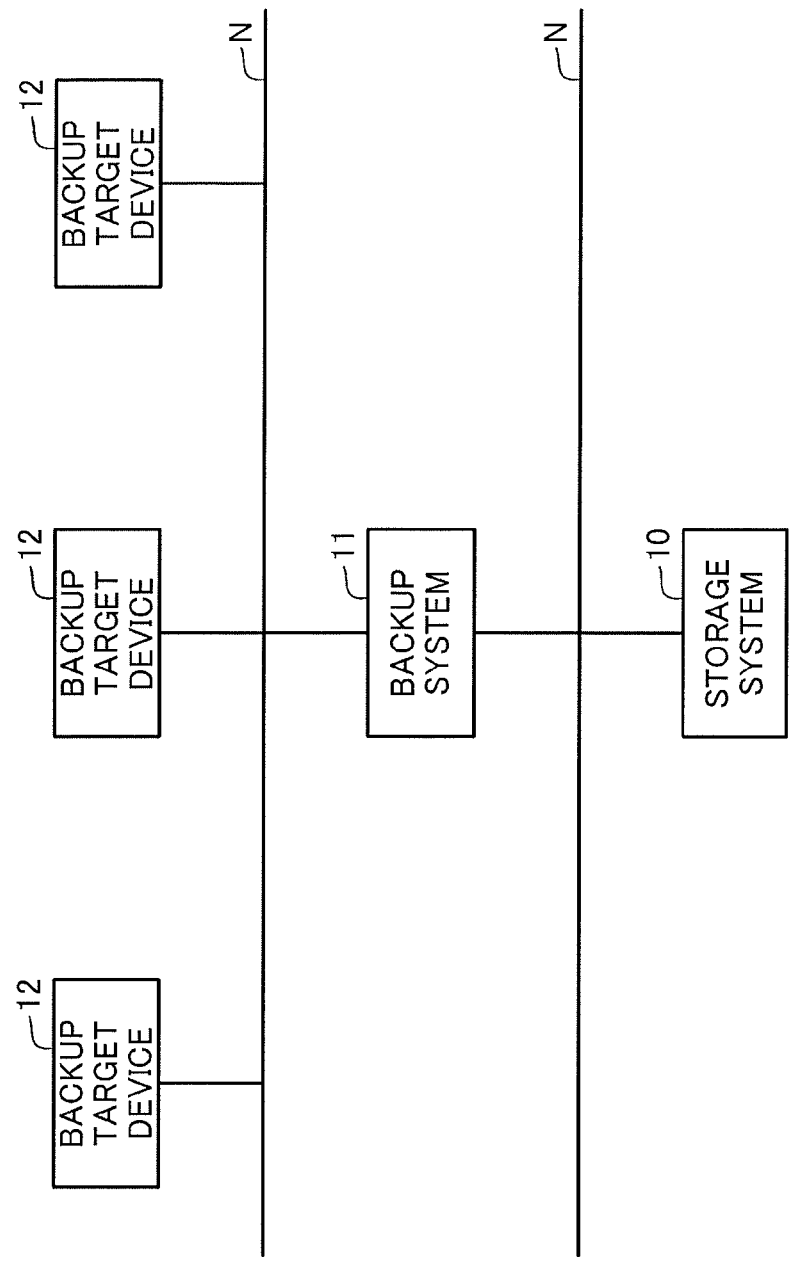
FIG. 10 is a block diagram showing a configuration of a whole system including a storage system of a second exemplary embodiment.
Figure 11:
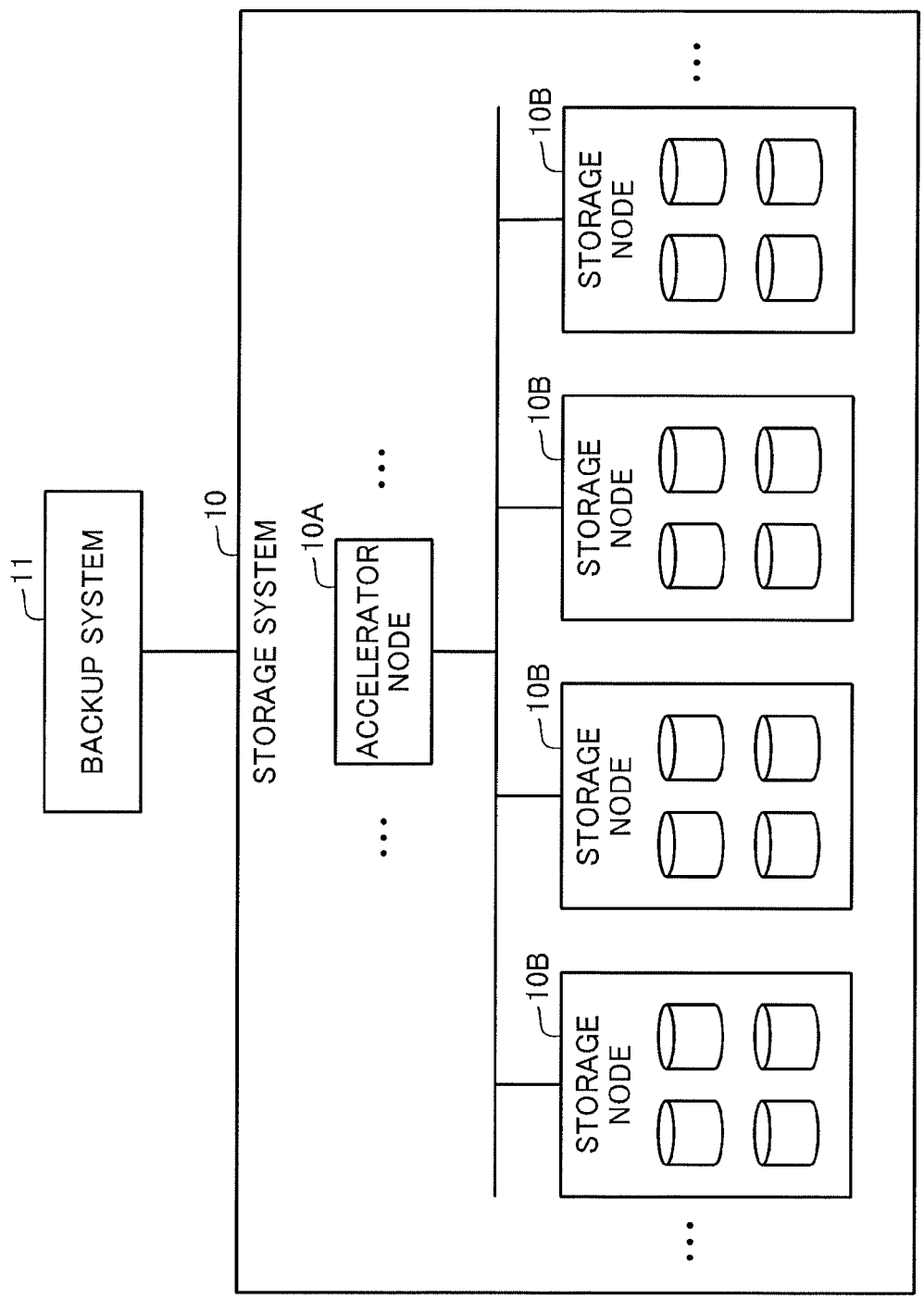
FIG. 11 is a block diagram schematically showing a configuration of the storage system of the second exemplary embodiment.
Figure 12:
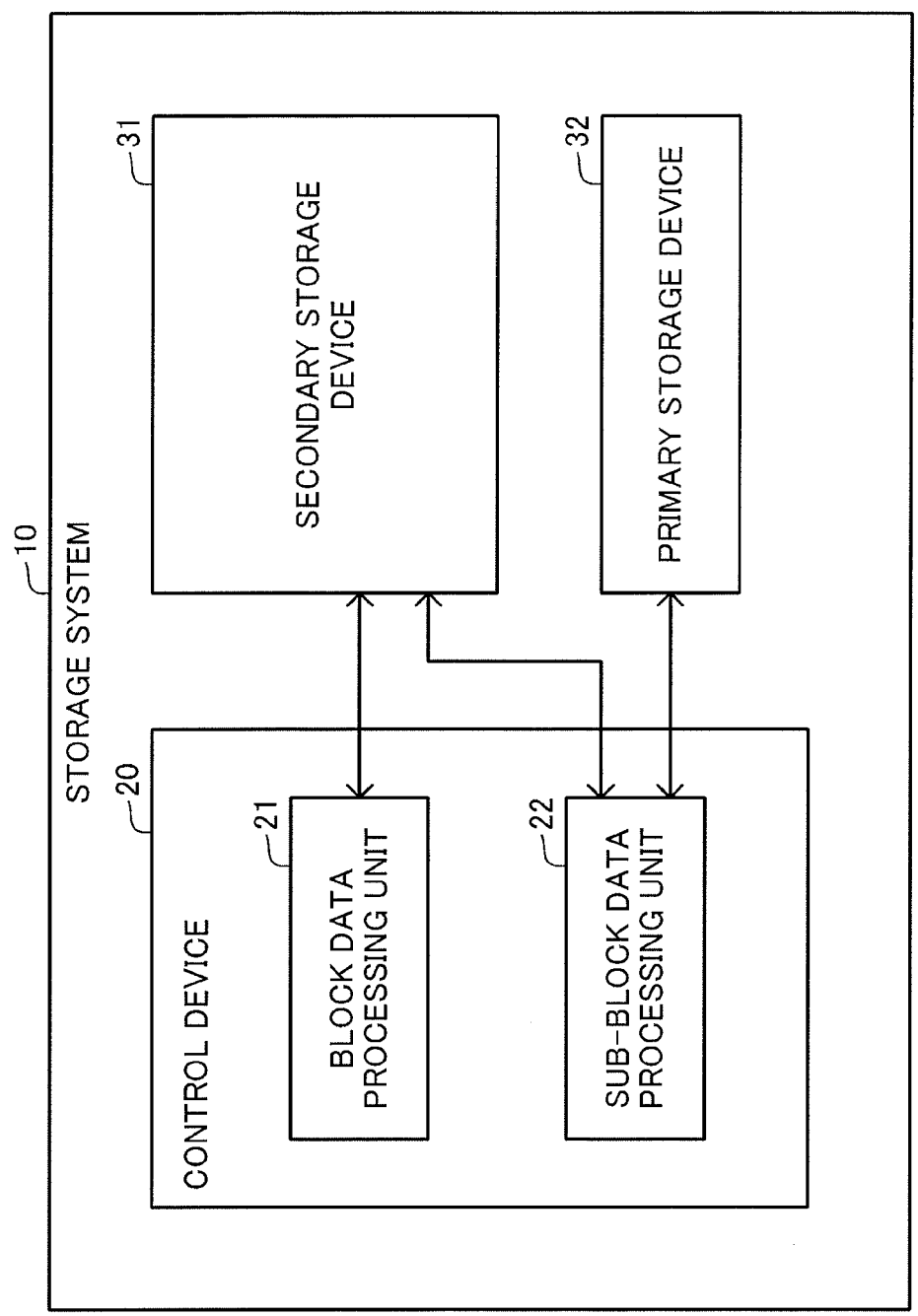
FIG. 12 is a function block diagram showing the configuration of the storage system of the second exemplary embodiment.

A second exemplary embodiment of the present invention will be described with reference to FIGS. 10 to 18. FIG. 10 is a block diagram showing a configuration of a whole system. FIG. 11 is a block diagram schematically showing a storage system, and FIG. 12 is a function block diagram showing the configuration. FIGS. 13 to 18 are explanation views for explaining an operation of a storage system.

This exemplary embodiment herein shows a case that the storage system is configured by connecting a plurality of server computers. However, the storage system of the present invention is not limited to the configuration with a plurality of computers, and may be configured by one computer.

As shown in FIG. 10, a storage system 10 of the present invention is connected to a backup system 11 that controls a backup process via a network N. The backup system 11 acquires backup target data (storage target data) stored in a backup target device 12 connected via the network N, and requests the storage system 10 to store. Thus, the storage system 10 stores the backup target data requested to be stored as a backup. It should be noted that the storage system 10 is not limited to store backup target data, and may store any type of data.

As shown in FIG. 11, the storage system 10 of this exemplary embodiment employs a configuration that a plurality of server computers are connected. To be specific, the storage system 10 is equipped with an accelerator node 10A serving as a server computer that controls the storing/reproducing operation of the storage system 10, and a storage node 10B serving as a server computer equipped with a storage device that stores data. The number of the accelerator node 10A and the number of the storage node 10B are not limited to those shown in FIG. 11, and a configuration that more nodes 10A and more nodes 10B are connected may be employed.

Further, the storage system 10 of this exemplary embodiment is a content address storage system that divides data and makes the data redundant, distributes the data and stores into a plurality of storage devices, and specifies a storing position in which the data is stored by a unique content address set in accordance with the content of the data to be stored. This content address storage system will be described later.

Assuming the storage system 10 is one system, the configuration and the function of the storage system 10 will be described below. In other words, the configuration and the function of the storage system 10 described below may be included in either the accelerator node 10A or the storage node 10B. The storage system 10 is not limited to the configuration including the accelerator node 10A and the storage node 10B, as shown in FIG. 11. The storage system 10 may have any configuration and, for example, may be configured by one computer. Moreover, the storage system 10 is not limited to a content address storage system.

FIG. 12 shows a configuration of the storage system 10. As shown in this drawing, the storage system 10 is equipped with storage devices 31 and 32 that store data, and a control device 20 that controls operation of storing and retrieving data into and from the storage devices 31 and 32. The control device 20 is equipped with a block data processing unit 21 that performs storage and reproduction of stream data, which is storage target data, in units of block data, and a sub-block data processing unit 22 that performs storage and reproduction in units of sub-block data generated by further dividing the block data into a plurality of pieces of data. Further, as the storage devices 31 and 32, the storage system 10 is equipped with a secondary storage device 31 such as a hard disk drive that stores block data and sub-block data, and a primary storage device 32 that stores sub-address data described below. It should be noted that although different storage devices are used as storage destinations according to the types of data to be stored in this example, they may be any kind of storage devices or may be the same storage device.

Actually, the block data processing unit 21 and the sub-block data processing unit 22 are configured by programs installed in a plurality of arithmetic devices such as a CPU (Central Processing Unit) of the accelerator node 10A and a CPU of the storage node 10B shown in FIG. 11. Moreover, the secondary storage device 31 is mainly configured of a secondary storage device of the storage node 10B shown in FIG. 11, and the primary storage device 32 is mainly configured of a primary storage device of the accelerator node 10A and a primary storage device of the storage node 10B shown in FIG. 11.

The abovementioned program is provided to the storage system 10, for example, in a state stored in a storage medium such as a CD-ROM. Alternatively, the program may be stored in a storage device of another server computer on the network and provided from the other server computer to the storage system 10 via the network.

Hereinafter, the configurations of the block data processing unit 21 and the sub-block data processing unit 22 will be described in detail. First, a content-address method of storing and retrieving stream data in block data units by the block data processing unit 21 (block data deduplication unit) will be described with reference to FIGS. 13 to 15.

Figure 13:
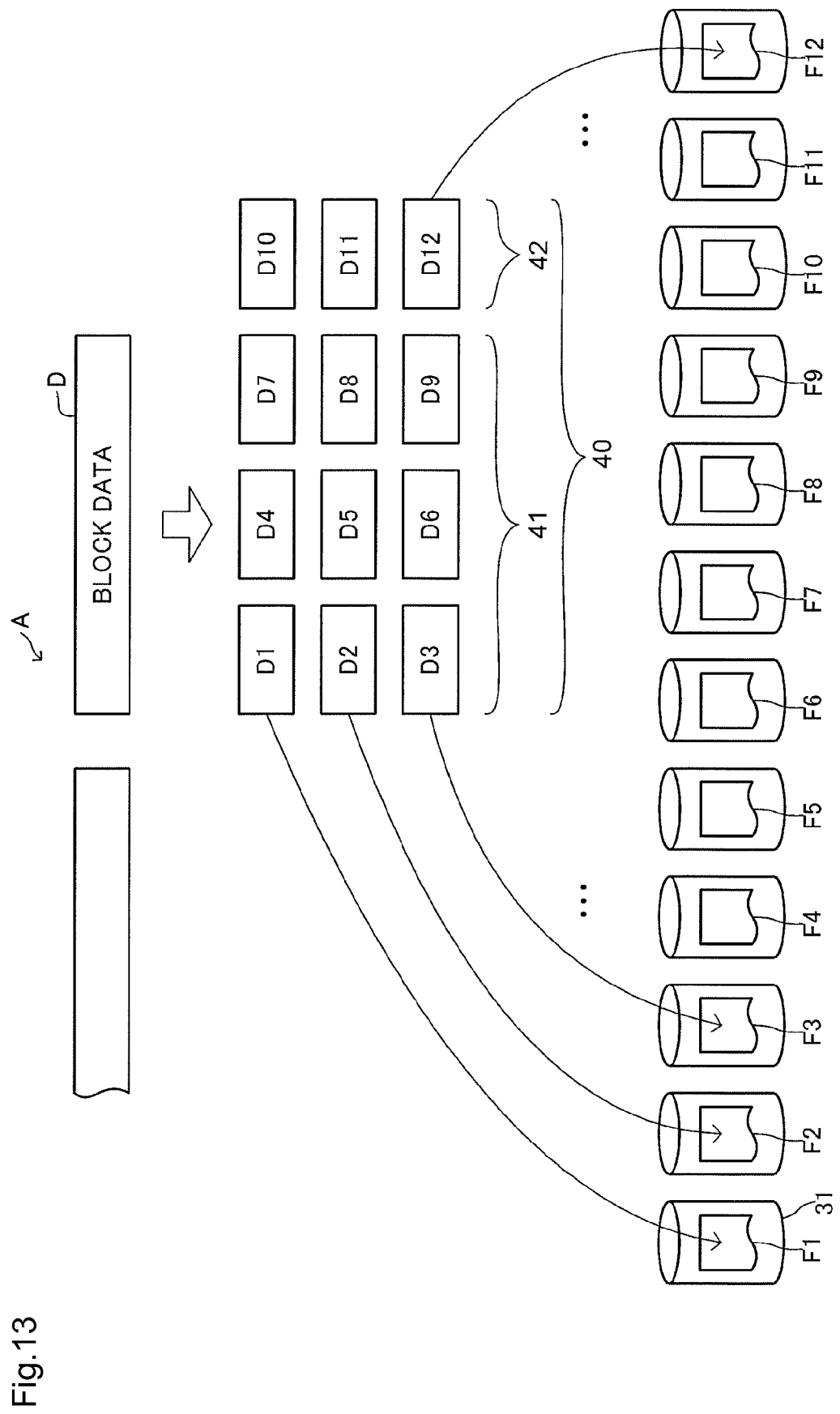
FIG. 13 is an explanation view for explaining an aspect of a data storage process in the storage system disclosed in FIG. 12.
Figure 14:
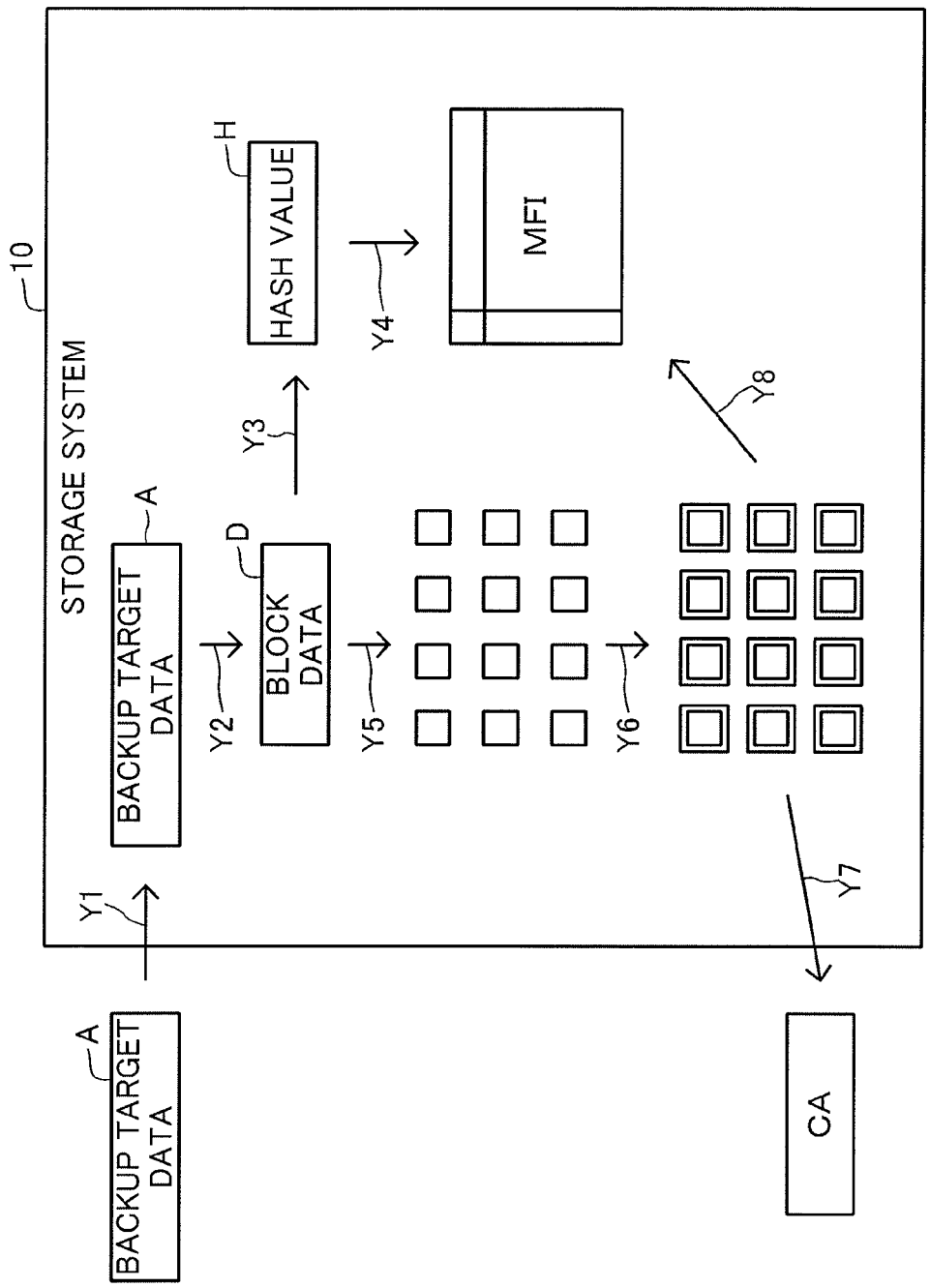
FIG. 14 is an explanation view for explaining the aspect of the data storage process in the storage system disclosed in FIG. 12.

First, when the block data processing unit 21 receives an input of the backup target data A, which is stream data, as shown by arrow Y1 in FIG. 14, the block data processing unit 21 divides the backup target data A into variable capacities (e.g., an average of 64 KB) or predetermined capacities (e.g., 64 KB) of block data D, as shown by arrow Y2 in FIGS. 13 and 14. Then, based on the data content of this block data D, the block data processing unit 21 calculates a unique hash value H (content identification information) representing the data content (arrow Y3). For example, a hash value H is calculated from the data content of the block data D by using a preset hash function. The process by the block data processing unit 21 is executed in the accelerator node 10A.

Then, by using the hash value H of the block data D of the backup target data A, the block data processing unit 21 checks whether or not the block data D has already been stored in the storage device 31. To be specific, the hash value H and content address CA that represents the storing position of the block data D having already been stored are related and registered in an MFI (Main Fragment Index) file. Therefore, in the case where the hash value H of the block data D calculated before storage exists in the MFI file, the block data processing unit 21 can determine that the block data D having the same content has already been stored (arrow Y4 in FIG. 14). In this case, the block data processing unit 21 acquires a content address CA related to a hash value H within the MFI that coincides with the hash value H of the block data D before storage, from the MFI file. Then, the block data processing unit 21 stores this content address CA (address data) as the content address CA of the block data D required to be stored. Alternatively, the block data processing unit 21 may store another piece of address data further referring to the content address CA referring to the block data D that has already been stored, in a tree structure. Consequently, the already stored data referred to by using this content address CA is used as the block data D required to be stored, and it becomes unnecessary to store the block data D required to be stored.

Further, the block data processing unit 21 compresses block data D determined that it has not been stored yet as described above, and divides the data into a plurality of pieces of fragment data having predetermined capacities as shown by arrow Y5 in FIG. 14. For example, as shown by reference numerals D1 to D9 in FIG. 13, the block data processing unit 21 divides the data into nine pieces of fragment data (division data 41). Moreover, the block data processing unit 21 generates redundant data so that the original block data can be restored even if some of the fragment data obtained by division are lost, and adds the redundant data to the fragment data 41 obtained by division. For example, as shown by reference numerals D10 to D12 in FIG. 13, the block data processing unit 21 adds three fragment data (redundant data 42). Thus, the block data processing unit 21 generates a data set 40 including twelve fragment data composed of the nine division data 41 and the three redundant data. The process by the block data processing unit 21 is executed by one storage node 10B.

Then, the block data processing unit 21 distributes and stores, one by one, the fragment data composing the generated data set into storage regions formed in the storage devices 31. For example, as shown in FIG. 13, in the case where the twelve fragment data D1 to D12 are generated, the block data processing unit 21 stores one of the fragment data D1 to D12 into one of data storage files F1 to F12 (data storage regions) formed in the twelve storage devices 31 (refer to arrow Y6 in FIG. 14).

Further, the block data processing unit 21 generates and manages a content address CA, which represents the storing positions of the fragment data D1 to D12 stored in the storage device 31 as described above, that is, the storing position of the block data D to be restored by the fragment data D1 to D12. To be specific, the block data processing unit 21 generates a content address CA by combining part (short hash) of a hash value H calculated based on the content of the stored block data D (e.g., the beginning 8 bytes in the hash value H) with information representing a logical storing position. Then, the block data processing unit 21 returns this content address CA to a file system within the storage system 10, namely, to the accelerator node 10A (arrow Y7 in FIG. 14). The accelerator node 10A then relates identification information such as the file name of the backup target data with the content address CA and manages them in the file system.

Further, the block data processing unit 21 relates the content address CA of the block data D with the hash value H of the block data D, and the respective storage nodes 10B manages them in the MFI file. Thus, the content address CA is related with the information specifying the file, the hash value H and so on, and stored into the storage devices 31 of the accelerator node 10A and the storage nodes 10B.

Furthermore, the block data processing unit 21 executes a control of retrieving backup target data stored as described above. For example, when the storage system 10 accepts a retrieval request with a specific file designated (refer to arrow Y11 in FIG. 15), based on the file system, the block data processing unit 21 firstly designates a content address CA, which is composed of short hash as part of a hash value corresponding to the file relating to the retrieval request and information of a logical position (refer to arrow Y12 in FIG. 15). Then, the block data processing unit 21 checks whether or not the content address CA is registered in the MFI file (refer to arrow 13 in FIG. 15). If the content address CA is not registered, the requested data is not stored, so that the block data processing unit 21 returns an error response.

Figure 15:
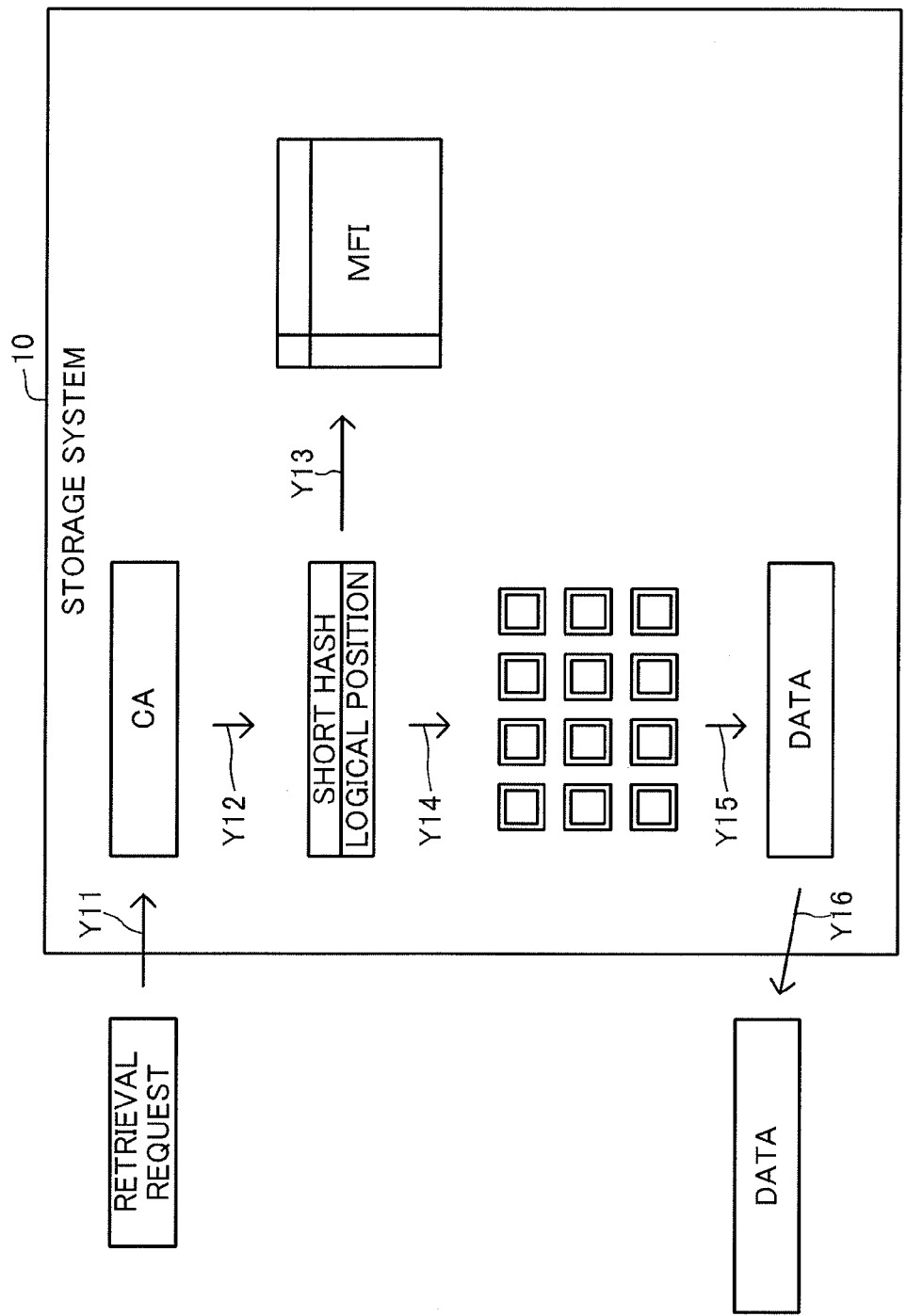
FIG. 15 is an explanation view for explaining an aspect of a data retrieval process in the storage system disclosed in FIG. 12.

On the other hand, if the content address CA relating to the retrieval request is registered, the block data processing unit 21 specifies a storing position designated by the content address CA, and retrieves each fragment data stored in the specified storing position as data requested to be retrieved (refer to arrow Y14 in FIG. 15). At this moment, if knowing the data storage files F1 to F12 storing the respective fragments and the storing position of one of the fragment data in the data storage files, the block data processing unit 21 can specify the storing positions of the other fragment data because the storing positions are the same.

Then, the block data processing unit 21 restores the block data D from the respective fragment data retrieved in response to the retrieval request (refer to arrow Y15 in FIG. 15). Moreover, the block data processing unit 21 connects a plurality of restored block data D to restore into a group of data like the file A, and returns to the accelerator node 10A that is controlling the retrieval (refer to arrow Y16 in FIG. 15).

Next, the sub-block data processing unit 22 (sub-block data deduplication unit) will be described with reference to FIGS.

16 to 18. It should be noted that the relation with the block data processing unit 21 described above will also be described below.

Figure 16:
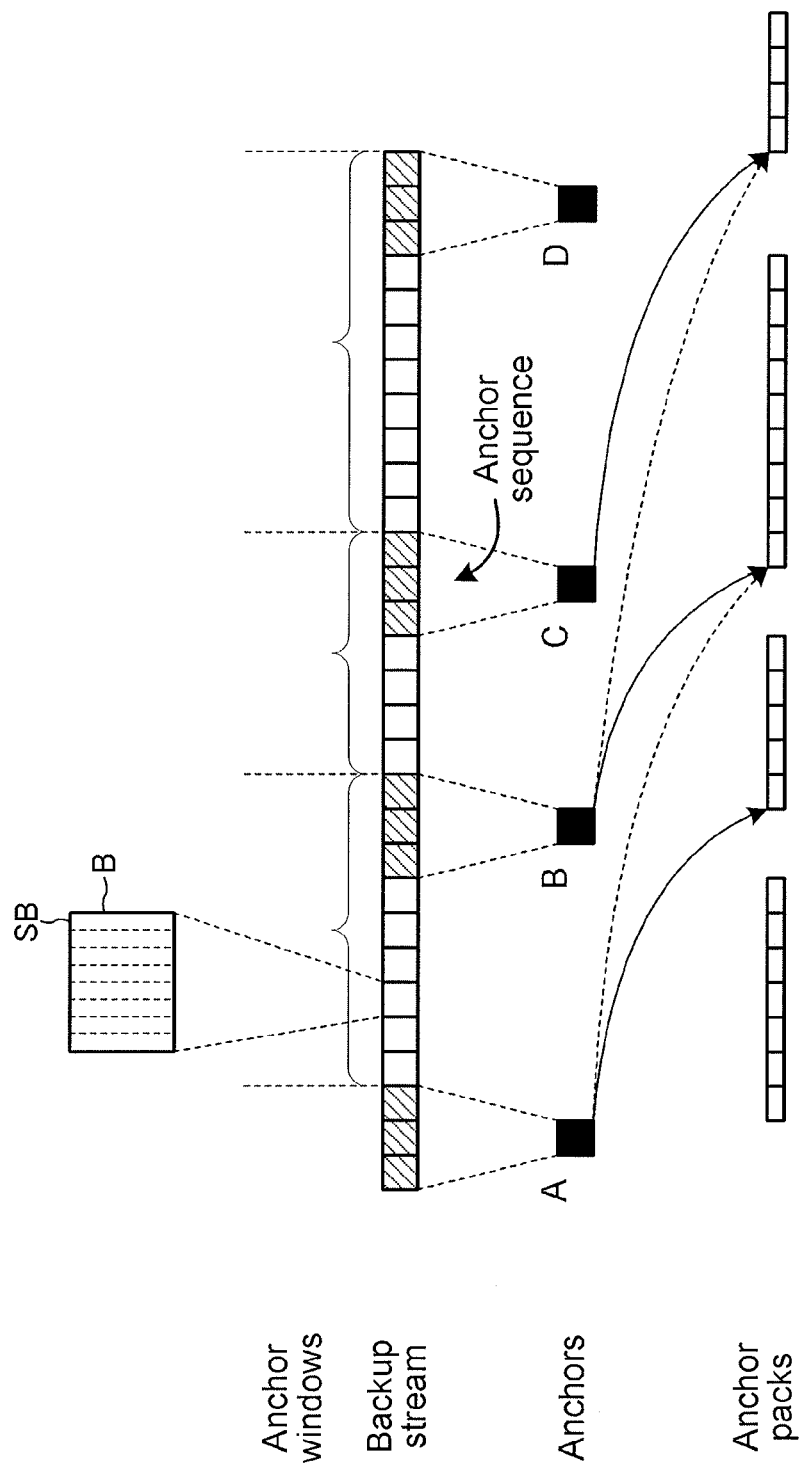
FIG. 16 is an explanation view for explaining the aspect of the data storage process in the storage system disclosed in FIG. 12.

First, as shown in FIG. 16, when storing a backup stream which is backup target data, the block data processing unit 21 divides the backup stream into pieces of block data B as described above, and executes a storing process into the storage device 31 while performing duplicate storage elimination. In addition, the sub-block data processing unit 22 performs the following process.

First, the sub-block data processing unit 22 calculates feature values of a set of block data B consisting of a predetermined number of pieces, which is a part of the backup stream, and if the feature values satisfy a preset condition, the sub-block data processing unit 22 sets the set of data as an "anchor sequence". For example, as indicated by portions with diagonal lines in FIG. 16, the sub-block data processing unit 22 calculates hash values of three pieces of block data B as feature values, and if the feature values satisfy a set condition such that the bit of the last three digits is "0", for example, the sub-block data processing unit 22 sets these three pieces of data as an "anchor sequence". Then, as shown in FIG. 16, the sub-block data processing unit 22 generates an "anchor" pointed to by the "anchor sequence", and each "anchor" stores a pointer to a data storage region called an "anchor pack". As such, when an "anchor sequence" having feature values satisfying the set condition is detected, the feature values and the "anchor pack" are stored in association with each other.

Then, when the sub-block data processing unit 22 detects an "anchor sequence" as described above, the sub-block data processing unit 22 further divides adjacent block data B, that is, block data B within the anchor window where the detected anchor sequence belongs, into a plurality of pieces to generate pieces of sub-block data SB. For example, if the data capacity of the block data B is 64 KB, the sub-block data processing unit 22 divides the block data B into a plurality of pieces of sub-block data SB (for example, it is 8 pieces of average 8 KB size). Further, the sub-block data processing unit 22 calculates a hash value as a value based on the data content of each piece of sub-block data, and associates the hash value with a pointer pointing to each piece of sub-block data. Then, the sub-block data processing unit 22 stores the sub-block data in the storage device 31, and also sequentially stores the association between the hash value and the pointer pointing to the sub-block data in the "anchor pack" associated with the detected "anchor sequence". In this example, the association between the pointer pointing to the sub-block data and the hash value, to be stored in the anchor pack, is used as sub-address data representing the storage destination of the sub-block data. However, the hash value itself of the sub-block data may be used as address data pointing to the sub-block data. It should be noted that the "anchor pack" is stored in the primary storage device 32.

The sub-block data processing unit 22 detects the "anchor sequence" as described above, and if the feature values of the "anchor sequence" have already existed in the primary storage device 32, retrieves the "anchor pack" associated with the feature values and having been stored in the primary storage device 32 to perform a duplicate storage elimination process. Specifically, the sub-block data processing unit 22 compares the hash value (sub-address data) of the sub-block data generated by dividing the block data of the backup stream with the sub-address data in the retrieved "anchor pack", and if there is an identical value, determines that the sub-block address has already been stored in the storage device 31 so that it is duplicated. Accordingly, the sub-block data processing unit 22 stores the sub-address data in the "anchor pack" as the sub-block data of the backup stream by pointing it, to eliminate duplicate storage. On the other hand, if the hash value (sub-address data) of the sub-block data generated by dividing the block data of the backup stream is not found in the retrieved "anchor pack", the sub-block data processing unit 22 newly stores the sub-block data in the storage device 31, and stores the hash value of the sub-block data in the "anchor pack" as sub-address data pointing to the sub-block data.

It should be noted that the duplicate storage elimination performed by dividing block data into sub-block data may be applied only to block data which was not deduplicated by the block data processing unit 21.

Figure 17:
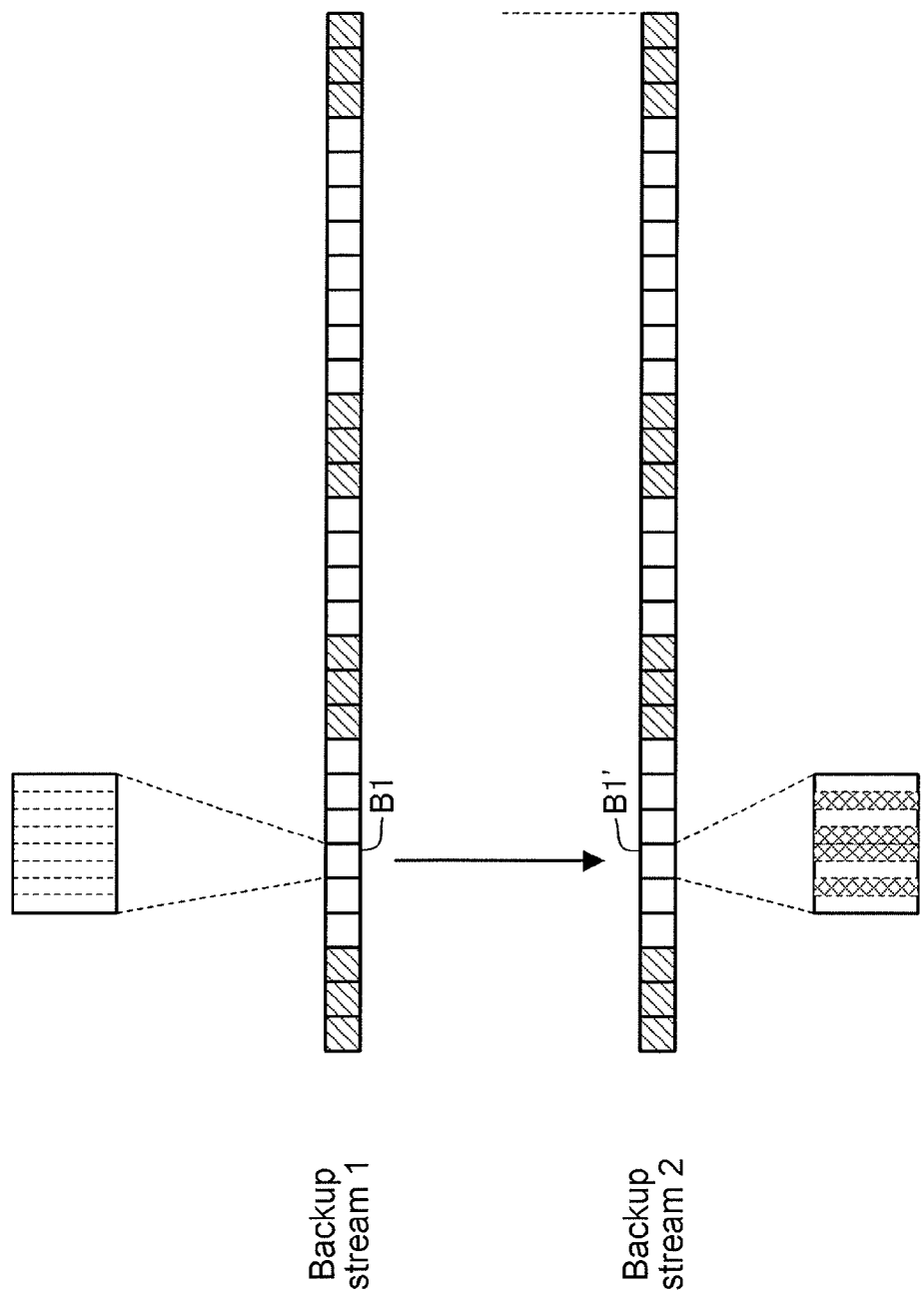
FIG. 17 is an explanation view for explaining the aspect of the data storage process in the storage system disclosed in FIG. 12.

Here, a specific example of the duplicate storage elimination process performed on sub-block data will be described with reference to FIGS. 17 and 18.

First, it is assumed that a "backup stream 1" is stored in the storage system 10 in a state where no data has been stored. At this moment, pieces of block data are stored in the storage device 31, and pieces of address data based on the hash values of the respective pieces of block data, pointing to the pieces of block data, are also stored. At the same time, feature values of a predetermined number of pieces of block data are calculated, and when an "anchor sequence" in which the feature values satisfy the set condition is detected, an "anchor pack" associated therewith is generated in the primary storage device 32. Then, block data adjacent to the "anchor sequence" is divided into pieces of sub-block data and stored in the secondary storage device 31. Further, hash values of the respective pieces of sub-block data are calculated, and are sequentially stored in the "anchor pack" as sub-address data pointing to the respective pieces of sub-block data.

Then, assuming that a "backup stream 2" is stored as an update of the "backup stream 1" in the storage device 10, first, the "backup stream 2" is sequentially divided into block data, on which a duplicate storage elimination process is performed in data block units. In this example, only the data content of block data indicated by the reference numeral B1' is assumed to be updated. In that case, as the block data B1' is not stored in the storage device 31, duplicate storage elimination in block data units is not performed. However, in the present invention, duplicate storage elimination is performed on the block data B1' in sub-block data units.

As described above, at the same time as the "backup stream 2" is processed in block data units, feature values of the predetermined number of pieces of the block data are calculated, an "anchor sequence" in which the feature values satisfy the set condition is detected, and it is checked whether or not the feature values have been known, that is, the feature values have been stored in the primary storage device 32. If the feature values of the detected "anchor sequence" have been stored, an "anchor pack" in the primary storage device 32, associated with the feature values, is retrieved. This means that in this example, an "anchor pack" stored with respect to the "backup stream 1" is retrieved, in which the hash values of the sub-block data generated by dividing the block data B1 are stored as sub-address data.

Further, when the "anchor sequence" of the "backup stream 2" is detected as described above, block data adjacent to the detected "anchor sequence" is divided into pieces of sub-block data, and their hash values are calculated. In particular, this process is performed on block data B1' on which duplicate storage elimination was not performed in block data units, as described above. Then, the calculated hash value of the sub-block data B1' is compared with the sub-address data in the retrieved "anchor pack" to check whether or not there is an identical value. If there is an identical value, as the corresponding sub-block data has already been stored in the storage device, the sub-address data in the "anchor pack" is pointed to as sub-block data to be stored. On the other hand, if there is no identical value, the corresponding sub-block data is newly stored in the storage device 31, and the hash value is included in the "anchor pack" as sub-address data pointing to the stored sub-block data.

Figure 18:
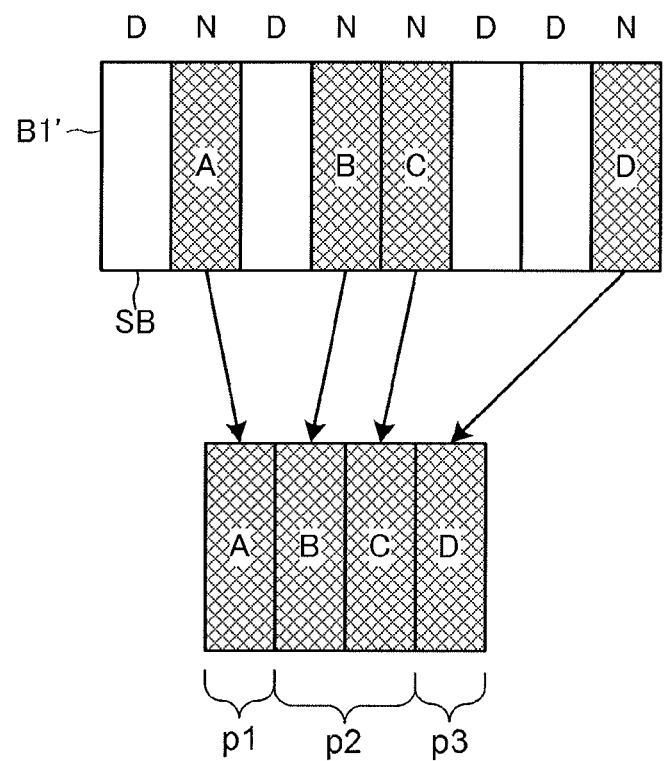
FIG. 18 is an explanation view for explaining the aspect of the data storage process in the storage system disclosed in FIG. 12.

For example, as shown in FIG. 18, if, of the block data B1' on which duplicate storage elimination was not performed in block data units, some pieces of its sub-block data SB have already been stored in sub-block data units (reference numeral D) while some pieces of sub-block data SB (A, B, C, D) indicated by shading are not stored (reference numeral N), these pieces of sub-block data (A, B, C, D) are stored in a coalesced state. Thereby, metadata pointing to these pieces of sub-block data can be reduced.

As described above, if duplicate storage elimination is performed not in block data units but in sub-block data units, the efficiency of duplicate storage elimination can be improved compared with the case of storing the entire block data B1'. Further, the sub-address data in the "anchor pack", used for checking whether or not the sub-block data has been stored, is stored in the primary storage device 32 in which the storing and retrieving speed is higher than that of the secondary storage device 31. As such, it is possible to speed up a duplicate storage elimination process in sub-block units. However, the "anchor pack" may be stored in the secondary storage device 31, or in any storage device.

Further, the "anchor pack" may be deleted temporarily at predetermined times (for example, periodically). Thereby, sub-address data pointing to sub-block data which has not been used any more can be eliminated, whereby it is possible to prevent the storage capacity of the primary storage device 32 from being bloated.

In the present embodiment, a plurality of "anchor packs", pointed to by an "anchor" corresponding to an "anchor sequence", are generated. For example, as shown in FIG. 16, if "anchor sequences" corresponding to the reference signs A and B are detected sequentially, the "anchor" indicated by the reference sign A is not only associated by pointing to the corresponding "anchor pack" (see an arrow of a solid line) but also associated by pointing to another "anchor pack" corresponding to the "anchor" indicated by the reference sign B which is to be detected subsequently (an arrow of a dotted line). Thereby, as it is possible to easily access the "anchor pack" of sub-block data close to the position of the detected "anchor sequence", duplicated data can be found more easily.

<Supplementary Notes>

Figure 19:
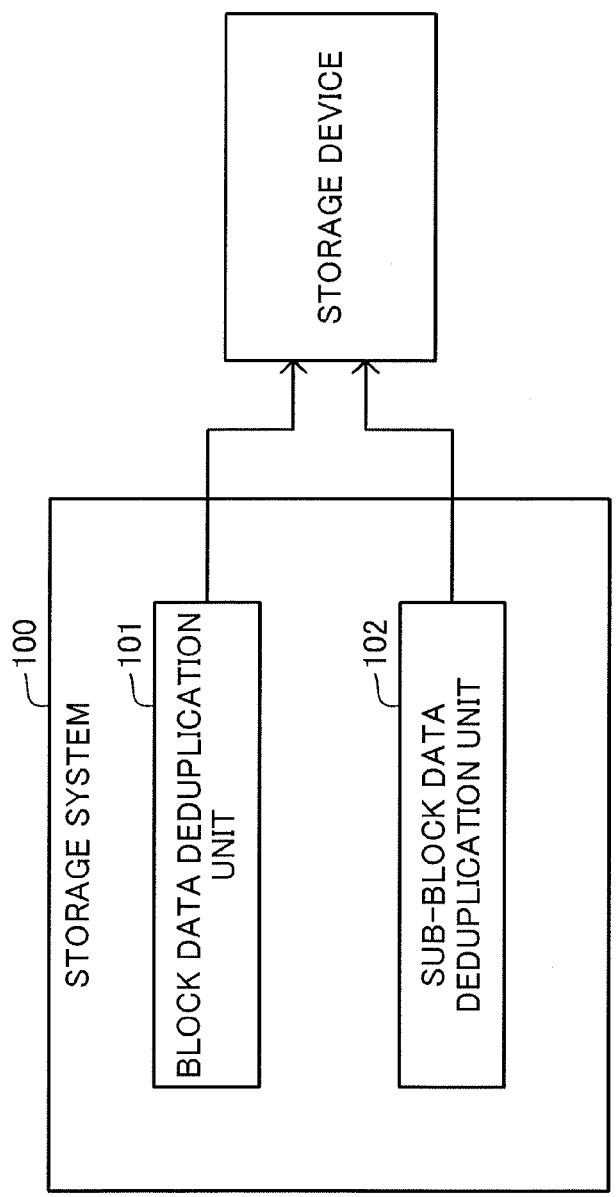
FIG. 19 is a block diagram showing the configuration of a storage system according to Supplementary Note 1.

The whole or part of the exemplary embodiments disclosed above can be described as the following supplementary notes. Outlines of the configurations of a storage system (see FIG. 19), a computer-readable medium storing a program, and an information processing method will be described below. However, the present invention is not limited to the configurations described below.

(Supplementary Note 1)

A storage system 100, comprising:

a block data deduplication unit 101 that stores, in a storage device, block data generated by dividing a data stream into arbitrary-sized blocks, the block data being pointed to by address data based on a data content of the block data, and when attempting to store, in the storage device, another piece of block data having a data content identical to the data content of the block data having been stored in the storage device, stores, in the storage device, the address data pointing to the block data having been stored in the storage device as the other piece of block data to thereby perform duplicate storage elimination of the block data; and a sub-block data deduplication unit 102 that stores, in the storage device, sub-block data generated by further dividing the block data into a plurality of pieces of data, each of the pieces of sub-block data being pointed to by a piece of sub-address data based on a data content of the sub-block data, stores a sub-address data group including pieces of sub-address data in a predetermined storage device, and when attempting to store, in the storage device, another piece of sub-block data having a data content identical to the data content of the sub-block data having been stored in the storage device, stores, in the predetermined storage device, the piece of sub-address data pointing to the sub-block data having been stored in the storage device as the other piece of sub-block data to thereby perform duplicate storage elimination of the sub-block data.

(Supplementary Note 2)

The storage system, according to supplementary note 1, wherein the sub-block data deduplication unit performs duplicate storage elimination of the sub-block data on the pieces of sub-block data generated by dividing the other block data on which duplicate storage elimination is not performed by the block data deduplication unit.

(Supplementary Note 3)

The storage system, according to supplementary note 1, wherein if a feature value detected from at least one piece of block data in the data stream based on a data content of the block data satisfies a set condition, the sub-block data deduplication unit stores, in the predetermined storage device, the sub-address data group pointing to pieces of sub-block data generated by dividing another piece of block data adjacent to the block data from which the feature value satisfying the set condition is detected, in association with the feature value satisfying the set condition.

(Supplementary Note 4)

The storage system, according to supplementary note 3, wherein if the feature value detected from the piece of block data in the data stream has already been stored in the predetermined storage device, the sub-block data deduplication unit compares the sub-address data group having been stored in association with the feature value with a sub-address data group pointing to pieces of sub-block data constituting another block data adjacent to the block data from which the feature value is detected, to thereby perform duplicate storage elimination of the sub-block data.

(Supplementary Note 5)

The storage system, according to supplementary note 4, wherein if a plurality of pieces of the sub-block data are not stored in the storage device as a result of comparison between the sub-address data groups, the sub-block data deduplication unit stores the pieces of sub-block data by combining them.

(Supplementary Note 6)

The storage system, according to supplementary note 3, wherein the sub-block data deduplication unit stores the feature value satisfying the set condition in the predetermined storage device in association with a plurality of sub-address data groups.

(Supplementary Note 7)

The storage system, according to supplementary note 2, wherein the sub-block data deduplication unit stores the sub-address data group associated with the feature value satisfying the set condition in the predetermined storage device in which a reading and writing speed is higher than that of the storage device storing the block data and the sub-block data.

(Supplementary Note 8)

A computer-readable medium storing a program comprising instructions for causing an information processor device to realize:

a block data deduplication unit that stores, in a storage device, block data generated by dividing a data stream into arbitrary-sized blocks, the block data being pointed to by address data based on a data content of the block data, and when attempting to store, in the storage device, another piece of block data having a data content identical to the data content of the block data having been stored in the storage device, stores, in the storage device, the address data pointing to the block data having been stored in the storage device as the other piece of block data to thereby perform duplicate storage elimination of the block data; and a sub-block data deduplication unit that stores, in the storage device, sub-block data generated by further dividing the block data into a plurality of pieces of data, each of the pieces of sub-block data being pointed to by a piece of sub-address data based on a data content of the sub-block data, stores a sub-address data group including pieces of sub-address data in a predetermined storage device, and when attempting to store, in the storage device, another piece of sub-block data having a data content identical to the data content of the sub-block data having been stored in the storage device, stores, in the predetermined storage device, the piece of sub-address data pointing to the sub-block data having been stored in the storage device as the other piece of sub-block data to thereby perform duplicate storage elimination of the sub-block data.

(Supplementary Note 9)

The computer-readable medium storing the program according to supplementary note 8, wherein the sub-block data deduplication unit performs duplicate storage elimination of the sub-block data on the pieces of sub-block data generated by dividing the other block data on which duplicate storage elimination is not performed by the block data deduplication unit.

(Supplementary Note 10)

The computer-readable medium storing the program according to supplementary note 8, wherein if a feature value detected from at least one piece of block data in the data stream based on a data content of the block data satisfies a set condition, the sub-block data deduplication unit stores, in the predetermined storage device, the sub-address data group pointing to pieces of sub-block data generated by dividing another piece of block data adjacent to the block data from which the feature value satisfying the set condition is detected, in association with the feature value satisfying the set condition.

(Supplementary Note 11)

An information processing method, comprising:

storing, in a storage device, block data generated by dividing a data stream into arbitrary-sized blocks, the block data being pointed to by address data based on a data content of the block data, and when attempting to store, in the storage device, another piece of block data having a data content identical to the data content of the block data having been stored in the storage device, storing, in the storage device, the address data pointing to the block data having been stored in the storage device as the other piece of block data thereby performing duplicate storage elimination of the block data; and storing, in the storage device, sub-block data generated by further dividing the block data into a plurality of pieces of data, each of the pieces of sub-block data being pointed to by a piece of sub-address data based on a data content of the sub-block data, storing a sub-address data group including pieces of sub-address data in a predetermined storage device, and when attempting to store, in the storage device, another piece of sub-block data having a data content identical to the data content of the sub-block data having been stored in the storage device, storing, in the predetermined storage device, the piece of sub-address data pointing to the sub-block data having been stored in the storage device as the other piece of sub-block data thereby performing duplicate storage elimination of the sub-block data.

(Supplementary Note 12)

The information processing method, according to supplementary note 11, further comprising performing duplicate storage elimination of the sub-block data on the pieces of sub-block data generated by dividing the other block data on which duplicate storage elimination is not performed.

(Supplementary Note 13)

The information processing method, according to supplementary note 12, further comprising if a feature value detected from at least one piece of block data in the data stream based on a data content of the block data satisfies a set condition, storing, in the predetermined storage device, the sub-address data group pointing to pieces of sub-block data generated by dividing another piece of block data adjacent to the block data from which the feature value satisfying the set condition is detected, in association with the feature value satisfying the set condition.

The invention claimed is:

1. A storage system including a processor, comprising:
a block data deduplication unit implemented by the processor that stores, in a storage device, block data generated by dividing a data stream into arbitrary-sized blocks, the block data being pointed to by address data based on a data content of the block data, and when attempting to store, in the storage device, another piece of block data having a data content identical to the data content of the block data having been stored in the storage device, stores, in the storage device, the address data pointing to the block data having been stored in the storage device as the other piece of block data to thereby perform duplicate storage elimination of the block data; and
a sub-block data deduplication unit implemented by the processor that stores, in the storage device, sub-block data generated by further dividing the block data into a plurality of pieces of data, each of the pieces of sub-block data being pointed to by a piece of sub-address data based on a data content of the sub-block data, stores a sub-address data group including pieces of sub address data in a predetermined storage device, and when attempting to store, in the storage device, another piece of sub-block data having a data content identical to the data content of the sub-block data having been stored in the storage device, stores, in the predetermined storage device, the piece of sub-address data pointing to the sub-block data having been stored in the storage device as the other piece of sub-block data to thereby perform duplicate storage elimination of the sub-block data, wherein if a feature value detected from at least one piece of block data in the data stream based on a data content of the block data satisfies a set condition, the sub-block data deduplication unit stores, in the predetermined storage device, the sub-address data group pointing to pieces of sub-block data generated by dividing another piece of block data corresponding to the block data from which the feature value satisfying the set condition is detected, in association with the feature value satisfying the set condition.

2. The storage system, according to claim 1, wherein the sub-block data deduplication unit performs duplicate storage elimination of the sub-block data on the pieces of sub-block data generated by dividing the other block data on which duplicate storage elimination is not performed by the block data deduplication unit.

3. The storage system, according to claim 1, wherein if a feature value detected from at least one piece of block data in the data stream based on a data content of the block data satisfies a set condition, the sub-block data deduplication unit stores, in the predetermined storage device, the sub-address data group pointing to pieces of sub-block data generated by dividing another piece of block data adjacent to the block data from which the feature value satisfying the set condition is detected, in association with the feature value satisfying the set condition.

4. The storage system, according to claim 3, wherein if the feature value detected from the piece of block data in the data stream has already been stored in the predetermined storage device, the sub-block data deduplication unit compares the sub-address data group having been stored in association with the feature value with a sub-address data group pointing to pieces of sub-block data constituting another block data adjacent to the block data from which the feature value is detected, to thereby perform duplicate storage elimination of the sub-block data.

5. The storage system, according to claim 4, wherein if a plurality of pieces of the sub-block data are not stored in the storage device as a result of comparison between the sub-address data groups, the sub-block data deduplication unit stores the pieces of sub-block data by combining them.

6. The storage system, according to claim 3, wherein the sub-block data deduplication unit stores the feature value satisfying the set condition in the predetermined storage device in association with a plurality of sub-address data groups.

7. The storage system, according to claim 2, wherein the sub-block data deduplication unit stores the sub-address data group associated with the feature value satisfying the set condition in the pre-determined storage device in which a reading and writing speed is higher than that of the storage device storing the block data and the sub-block data.

8. A non-transitory computer-readable medium storing a program comprising instructions for causing an information processor device to realize:

a block data deduplication unit that stores, in a storage device, block data generated by dividing a data stream into arbitrary-sized blocks, the block data being pointed to by address data based on a data content of the block data, and when attempting to store, in the storage device, another piece of block data having a data content identical to the data content of the block data having been stored in the storage device, stores, in the storage device, the address data pointing to the block data having been stored in the storage device as the other piece of block data to thereby perform duplicate storage elimination of the block data; and a sub-block data deduplication unit that stores, in the storage device, sub-block data generated by further dividing the block data into a plurality of pieces of data, each of the pieces of sub-block data being pointed to by a piece of sub-address data based on a data content of the sub-block data, stores a sub-address data group including pieces of sub-address data in a predetermined storage device, and when attempting to store, in the storage device, another piece of sub-block data having a data content identical to the data content of the sub-block data having been stored in the storage device, stores, in the predetermined storage device, the piece of sub-address data pointing to the sub-block data having been stored in the storage device as the other piece of sub-block data to thereby perform duplicate storage elimination of the sub-block data, wherein if a feature value detected from at least one piece of block data in the data stream based on a data content of the block data satisfies a set condition, the sub-block data deduplication unit stores, in the predetermined storage device, the sub-address data group pointing to pieces of sub-block data generated by dividing another piece of block data corresponding to the block data from which the feature value satisfying the set condition is detected, in association with the feature value satisfying the set condition.

9. The non-transitory computer-readable medium storing the program according to claim 8, wherein the sub-block data deduplication unit performs duplicate storage elimination of the sub-block data on the pieces of sub-block data generated by dividing the other block data on which duplicate storage elimination is not performed by the block data deduplication unit.

10. The non-transitory computer-readable medium storing the program according to claim 8, wherein if a feature value detected from at least one piece of block data in the data stream based on a data content of the block data satisfies a set condition, the sub-block data deduplication unit stores, in the predetermined storage device, the sub-address data group pointing to pieces of sub-block data generated by dividing another piece of block data adjacent to the block data from which the feature value satisfying the set condition is detected, in association with the feature value satisfying the set condition.

11. An information processing method, comprising:

storing, in a storage device, block data generated by dividing a data stream into arbitrary-sized blocks, the block data being pointed to by address data based on a data content of the block data, and when attempting to store, in the storage device, another piece of block data having a data content identical to the data content of the block data having been stored in the storage device, storing, in the storage device, the address data pointing to the block data having been stored in the storage device as the other piece of block data thereby performing duplicate storage elimination of the block data; and storing, in the storage device, sub-block data generated by further dividing the block data into a plurality of pieces of data, each of the pieces of sub-block data being pointed to by a piece of sub-address data based on a data content of the sub-block data, storing a sub-address data group including pieces of sub-address data in a predetermined storage device, and when attempting to store, in the storage device, another piece of sub-block data having a data content identical to the data content of the sub-block data having been stored in the storage device, storing, in the predetermined storage device, the piece of sub-address data pointing to the sub-block data having been stored in the storage device as the other piece of sub-block data thereby performing duplicate storage elimination of the sub-block data, wherein if a feature value detected from at least one piece of block data in the data stream based on a data content of the block data satisfies a set condition, storing, in the predetermined storage device, the sub-address data group pointing to pieces of sub-block data generated by dividing another piece of block data corresponding to the block data from which the feature value satisfying the set condition is detected, in association with the feature value satisfying the set condition.

12. The information processing method, according to claim 11, further comprising performing duplicate storage elimination of the sub-block data on the pieces of sub-block data generated by dividing the other block data on which duplicate storage elimination is not performed.

13. The information processing method, according to claim 12, further comprising if a feature value detected from at least one piece of block data in the data stream based on a data content of the block data satisfies a set condition, storing, in the predetermined storage device, the sub-address data group pointing to pieces of sub-block data generated by dividing another piece of block data adjacent to the block data from which the feature value satisfying the set condition is detected, in association with the feature value satisfying the set condition.

* * * * *